(12) United States Patent
Armand et al.

(10) Patent No.: US 7,601,318 B2
(45) Date of Patent: Oct. 13, 2009

(54) METHOD FOR SYNTHESIS OF CARBON-COATED REDOX MATERIALS WITH CONTROLLED SIZE

(75) Inventors: Michel Armand, Montreal (CA);
Michel Gauthier, La Prairie (CA);
Jean-Francois Magnan, Neuville (CA);
Nathalie Ravet, Montreal (CA)

(73) Assignees: Hydro-Quebec, Montreal (CA); CNRS, Paris (FR); Universite de Montreal, Montreal (CA)

( * ) Notice: Subject to any disclaimer, the term of this patent is extended or adjusted under 35 U.S.C. 154(b) by 565 days.

(21) Appl. No.: 10/362,763

(22) PCT Filed: Sep. 21, 2001

(86) PCT No.: PCT/CA01/01319
§ 371 (c)(1),
(2), (4) Date: Jun. 19, 2003

(87) PCT Pub. No.: WO02/27823
PCT Pub. Date: Apr. 4, 2002

(65) Prior Publication Data
US 2004/0033360 A1 Feb. 19, 2004

(30) Foreign Application Priority Data
Sep. 26, 2000 (CA) .................... 2320661

(51) Int. Cl.
*H01B 1/08* (2006.01)
*H01M 4/58* (2006.01)
*C01B 17/96* (2006.01)

(52) U.S. Cl. .................... 423/306; 423/326; 423/327.1; 423/331; 423/332; 423/518; 423/544; 423/179.5; 429/221; 429/231.6; 429/218.1; 252/506; 252/518.1; 252/521.5; 252/521.6

(58) Field of Classification Search .................. 252/500, 252/506, 518.1, 521.5, 521.6; 423/306, 326, 423/327.1, 331, 332, 518, 544, 179.5; 429/221, 429/231.6, 218.1
See application file for complete search history.

(56) References Cited

U.S. PATENT DOCUMENTS 4,009,092 A 2/1977 Taylor .................... 204/242

(Continued)

FOREIGN PATENT DOCUMENTS

CA 2176452 * 11/1997

(Continued)

OTHER PUBLICATIONS

Huang et al. ("Approaching theoretical capacity of LiFeP)4 at room temperature at high rates" Electrochemical and solid-state letters, 4, A170-A172, 2001).*

(Continued)

*Primary Examiner*—Mark Kopec
*Assistant Examiner*—Tri V Nguyen
(74) *Attorney, Agent, or Firm*—Buchanan Ingersoll & Rooney PC

(57) ABSTRACT

A method for the synthesis of compounds of the formula $C-Li_xM_{1-y}M'_y(XO_4)_n$, where C represents carbon cross-linked with the compound $Li_xM_{1-y}M'_y(XO_4)_n$, in which x, y and n are numbers such as $0 \leq x \leq 2$, $0 \leq y \leq 0.6$, and $1 \leq n \leq 1.5$, M is a transition metal or a mixture of transition metals from the first period of the periodic table, M' is an element with fixed valency selected among $Mg^{2+}$, $Ca^{2+}$, $Al^{3+}$, $Zn^{2+}$ or a combination of these same elements and X is chosen among S, P and Si, by bringing into equilibrium, in the required proportions, the mixture of precursors, with a gaseous atmosphere, the synthesis taking place by reaction and bringing into equilibrium, in the required proportions, the mixture of the precursors, the procedure comprising at least one pyrolysis step of the carbon source compound in such a way as to obtain a compound in which the electronic conductivity measured on a sample of powder compressed at a pressure of 3750 $Kg \cdot cm^{-2}$ is greater than $10^{-8}$ $S \cdot cm^{-1}$. The materials obtained have excellent electrical conductivity, as well a very improved chemical activity.

90 Claims, 18 Drawing Sheets

U.S. PATENT DOCUMENTS

| | | | |
|---|---|---|---|
| 5,871,866 A | 2/1999 | Barker et al. | 429/231.1 |
| 5,910,382 A | 6/1999 | Goodenough et al. | |
| 5,958,624 A | 9/1999 | Frech et al. | |
| 6,254,844 B1 | 7/2001 | Takeuchi et al. | 423/306 |
| 6,319,632 B1 | 11/2001 | Amine | 429/218.2 |
| 6,387,568 B1 | 5/2002 | Barker et al. | 429/218.1 |
| 6,528,033 B1 | 3/2003 | Barker et al. | 423/306 |
| 2002/0047112 A1* | 4/2002 | Hosoya et al. | 257/9 |
| 2002/0195591 A1 | 12/2002 | Ravet et al. | |

FOREIGN PATENT DOCUMENTS

| | | |
|---|---|---|
| EP | 0 630 064 | 12/1994 |
| EP | 1 049 182 | 11/2000 |
| EP | 1 094 532 | 4/2001 |
| EP | 1 094 533 | 4/2001 |
| WO | 01/53 198 | 7/2001 |

OTHER PUBLICATIONS

Andersson, A.S. et al., "Thermal Stability of $LiFePO_4$-Based Cathodes", Electrochem and Solid-State Letters, 3 (2)66-68 (2000), The Electrochemical Society, Inc.

Ravet, N. et al., "Electroactivity of Natural and Synthetic Triphylite", Proceedings of the $10^{th}$ IMLB, Como, Italy, (May 2000).

Yamada, A. et al. "Optimized $LiFePO_4$ for Lithium Battery Cathodes", J. Electrochem Soc. 148 (3) A224-A229 (2001), The Electrochemical Society, Inc.

Scrosati, B., "Rechargeable Lithium Cells", Modem Batteries, 199-242 (1997) de C.A. Vincent & B. Scrosati publishers, London, Sydney, Auckland.

* cited by examiner

Figure 7 - Scanning electron microscopy (SEM) showing agglomerated nanoparticles of Budenheim $FePO_4 \cdot 2H_2O$ (grade E53-81).

Figure 8 - Scanning electron microscopy showing a typical particle of LiFePO$_4$ obtained by reaction in solid state between agglomerated nanoparticles of Budenheim FePO$_4$·2H$_2$O (grade E53-81) and Limtech Li$_2$CO$_3$ (99.9%) in the presence of a carbonated polyethylene-type additive according to example 4.

Figure 9. Dense particles of ferric phosphate dihydrate, Budenheim grade E53-82.

Figure 10. Scanning electron microscopy of dense particles of ferric phosphate dihydrate, Budenheim grade E53-82.

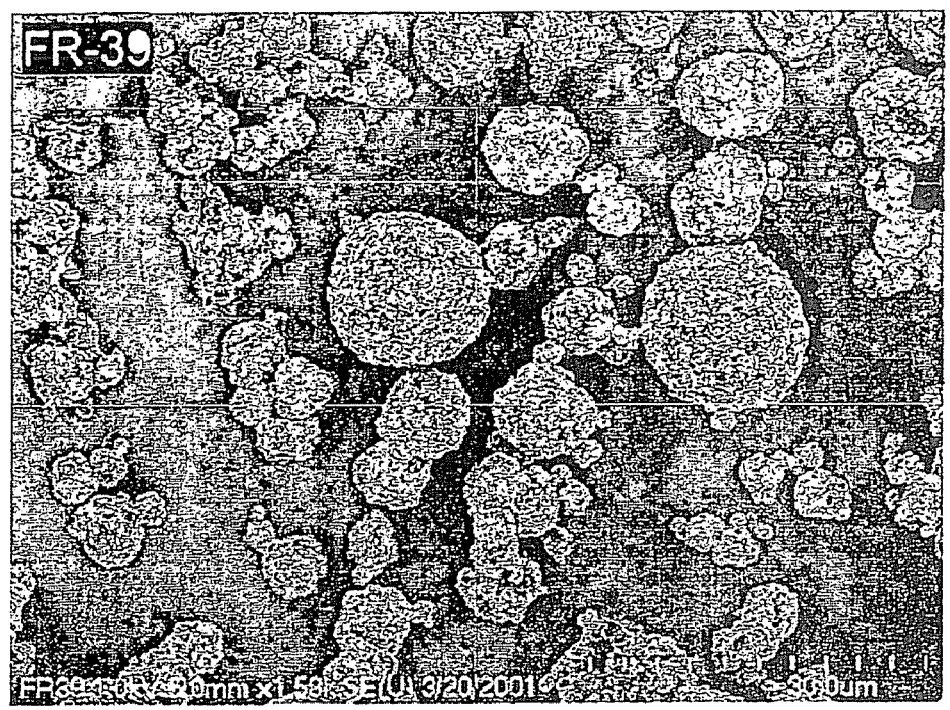
Figure 17. Spherical agglomerates of LiFePO4 obtained by spray drying the mixture of precursors.

Figure 18. Transmission electron microscope micrograph showing the coating and the cross-linking with carbon of the particles of LiFePO$_4$

METHOD FOR SYNTHESIS OF CARBON-COATED REDOX MATERIALS WITH CONTROLLED SIZE

FIELD OF THE INVENTION

The present invention relates to a method for preparing electrode materials that are able to make possible redox reactions by exchange of alkaline ions and electrons. The applications are in the area of primary or secondary electrochemical generators (batteries), supercapacity generators and in the area of modulation systems for electrochromic light.

PRIOR ART

Insertion compounds of the formula $LiMPO_4$ with olivine structure, where M is a metallic cation belonging to the first line of transition metals, e.g. Mn, Fe, Co or Ni, are known and their use as cathode material in lithium batteries has been reported by Goodenough et al. in the patent U.S. Pat. No. 5,910,382. In the Canadian patent application CA-A-2,307,119, the general nature of the "$LiMPO_4$ type" compounds was indicated insofar as, while essentially maintaining the same olivine structure, part of the M atoms may be substituted with other metals with valence between 2 and 3, in which the adjacent transition elements, or a part of the phosphorus, can be substituted by elements such as Si, S, Al, As. Similarly, the lithium that allows electroneutrality can occupy a fraction or all of the octahedral sites of the olivine structure, or possibly position itself in an interstitial position when all of the octahedral sites are occupied.

The formula $Li_{x+y}M_{1-(y+d+t+q+r)}D_dT_tQ_qR_r[PO_4]_{1-(p+s+v)}[SO_4]_p[SiO_4]_s[VO_4]_v$ in which:

M can be $Fe^{2+}$ or $Mn^{2+}$ or a mixture of the two;

D can be a metal in the +2 oxidation state chosen from the group containing $Mg^{2+}$, $Ni^{2+}$, $Co^{2+}$, $Zn^{2+}$, $Cu^{2+}$ and $Ti^{2+}$;

T can be a metal in the +3 oxidation state chosen from the group containing $Al^{3+}$, $Ti^{3+}$, $Cr^{3+}$, $Fe^{3+}$, $Mn^{3+}$, $Ga^{3+}$ and $V^{3+}$;

Q is a metal in the +4 oxidation state chosen from the group containing $Ti^{4+}$, $Ge^{4+}$, $Sn^{4+}$ and $V^{4+}$; and R is a metal in the +5 oxidation state chosen from the group containing $V^{5+}$, $Nb^{5+}$ and $Ta^{5+}$, with a definition of the parameters x, y, d, t, q, r, p, s and includes the general nature of the meaning given to the term "of the $Li_xMXO_4$ type, $0 \leq x \leq 2$" of the olivine structure in the meaning of the present invention and will be used in the following. The preferred substituents for the phosphorus are silicon and sulfur.

In these compounds prepared in the lithiated form (in discharged state), at least one of the transition metals is in oxidation state II. In the patent U.S. Pat. No. 5,910,382 and its CIP, as well as in the following patents and publications, the syntheses of the $LiMPO_4$ compounds are carried out using a salt of the transition metal M corresponding to oxidation state II and maintaining this oxidation state throughout the synthesis, up to the final product. The transition element, for which the valence II is maintained throughout the course of synthesis, no matter what method is used, is iron, with the majority of its compounds oxidizing spontaneously. For example, in air, $LiFePO_4$ has been produced by reaction in the solid state, at high temperature and under inert atmosphere, of various constituents (e.g. for the iron source $Fe(OOCCH_3)_2$, for the phosphate source, $NH_4H_2PO_4$ and for that of lithium, $Li_2CO_3$). In all these cases, the iron source is a salt in which the iron is in oxidation state II, which could be using iron acetate II as described in the patent U.S. Pat. No. 5,910,382, iron oxalate II as described in Electrochem and Solid-State Letters, 3, 66 (2000) and in the Proceedings of the $10^{th}$ IMLB, Como, Italy in May 2000, or vivianite ($Fe_3(PO_4)_2$ $8H_2O$) as described in the Canadian patent application CA-A-2,270,771.

The sensitivity of iron II with respect to oxidation by oxygen makes all of these synthesis processes very delicate and all possible precautions must be taken to completely exclude the presence of oxygen, and in particular at the time of thermal processing, which increases the cost of the material accordingly. This sensitivity gives rise to a lack of reproducibility of the electrochemical behavior of the samples. This problem is emphasized in Yamada et al., J. Electrochem Soc. 148, A224 (2001). In addition, iron is the most useful element which, due to its abundance and lack of toxicity, and the main application of the invention, is intended for an improved preparation of redox compounds containing this element. It is obvious that the results of the invention apply to manganese, vanadium, cobalt, titanium, vanadium, etc. under corresponding conditions, at their desired degree of oxidation. In a general way, any precursor of metal M in which the least costly degree of oxidation is the easiest to handle, does not correspond to the one required in the formula for the redox material $Li_xMXO_4$.

An improvement in these compounds has previously been suggested in the Canadian patent CA-A-2,270,771. In this document, it has been shown that the electrochemical performance of $LiFePO_4$ was greatly improved, no matter whether in terms of reversible capacity, cyclability or power, when the particles of the material are covered with a fine layer of electronically conductive carbon. In this application, the inventors have benefited from using an iron salt at oxidation state II, in the presence of an organic compound that can be pyrolyzed, under the synthesis conditions without it being possible for the carbon residue to become oxidized due to the low oxidizing power of the ferrous compound or of the atmosphere in equilibrium with the latter.

The patent application EP-A-1,094,532 describes a production method for materials for an active positive electrode. This method includes a step where a number of substances are mixed to obtain a precursor. Then the precursor is sintered to result in the synthesis of a compound of the formula $Li_xM_yPO_4$, in which x is greater than 0 and less than or equal to 2, y is greater than or equal to 0.8 and less than or equal to 1.2 and M includes at least one metal having 3d orbitals. A solid reducing agent is added in the course of the mixing step of the precursor in order to allow preparation, which is carried out under inert atmosphere, of the material for active positive electrodes that are capable of doping and dedoping lithium in a satisfactory and reversible marner.

EP-A-1,094,533 describes a non-aqueous electrolyte adapted for secondary batteries using a material or an active electrode containing a compound represented by the general formula $Li_xM_yPO_4$, in which x is greater than 0 and less than or equal to 2, and y is greater than or equal to 0.8 and less than or equal to 1.2, with M containing a 3d transition state, and the grains of $Li_xM_yPO_4$ are no greater in size than 10 micrometers. This non-aqueous electrolyte for secondary batteries is presented as having improved cyclic characteristics and a high capacity.

The international PCT application, reference number WO 01/53198, describes a material based on a mixed lithium metal compound that releases lithium ions by electrochemical interaction. This material is prepared using the necessary precursors, by reduction of at least one of the metallic ions by carbon.

Besides their electrochemical performance in lithium batteries, the interest in this new family of materials is to make use of elements that are non-toxic, abundant and inexpensive to extract. These characteristics are critical to the development of large lithium batteries that can be used, in particular, in the electric vehicle market where a pressing need has developed in view of the accumulation of greenhouse gases in the environment.

Thus there is a need to make use of a new procedure that is simpler and more reproducible, less complicated than those that are already known, while offering improved performance, in particular for any new technique that makes it possible to produce significant quantities of material without losing control of the quality, which is associated with the purity of the phases obtained and the obtaining of granulometries that are especially suited to electrochemical applications, and do so in a reproducible way.

SUMMARY OF THE INVENTION

The present invention describes a method of synthesis for compounds of the formula $Li_xM_{1-y}M'_y(XO_4)_n$, by bringing into equilibrium, in the required proportions, a mixture containing precursors of the constituents of the compound and reduction of the equilibrated mixture of the precursors with a reducing gas atmosphere. The initial mixture can be supplemented with a source of carbon, which makes possible the preparation of compounds of the formula $Li_xM_{1-y}M'_y(XO_4)_n$ in the form of a material made up of carbon-coated grains. The material thus obtained has an excellent size and grains that can be controlled in form and conductivity.

These materials can especially be used for the preparation of electrochemical cells having an electrolyte and at least two electrodes, of which at least one comprises at least one material synthesized according to one of the method according to the invention.

BRIEF DESCRIPTION OF THE DRAWINGS

FIG. 17: LiFePO$_4$ obtained using FePO$_4$×2H$_2$O and Li$_2$CO$_3$ dispersed and dried by spray drying in the presence of carbonated additive derived from cellulose according to example 12.

FIG. 18: LiFePO$_4$ observed by transmission electron microscopy according to example 13.

DESCRIPTION OF THE INVENTION

Figure 1:
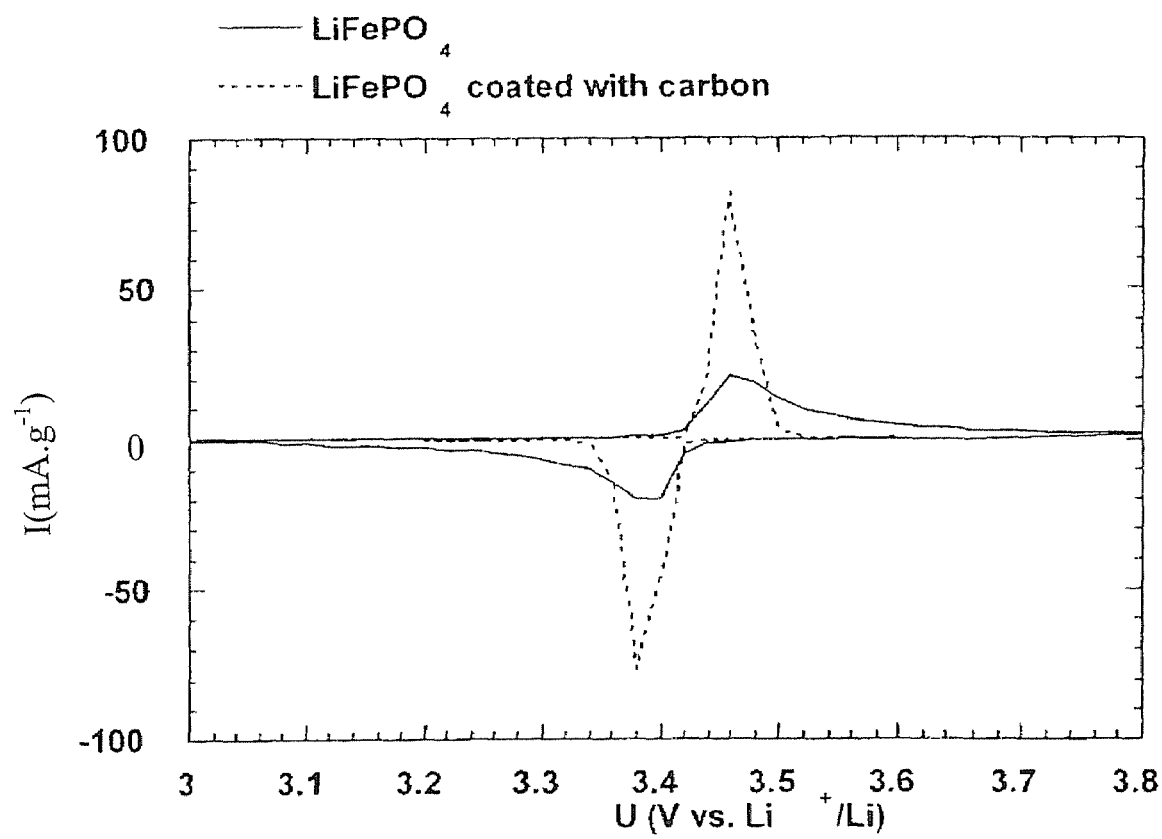
FIG. 1: $1^{st}$ cycle obtained by slow voltametry (v=20 mV·h$^{-1}$) at 80° C. for a battery containing non-carbonated LiFePO$_4$, synthesized using FePO$_4$.2H$_2$O (reduction by hydrogen) (solid lines) compared to the same sample after carbonization (dotted lines).

A first object of the present invention is a method for the synthesis of compounds of the formula C—Li$_x$M$_{1-y}$M'$_y$(XO$_4$)$_n$, wherein C represents carbon cross-linked with the compound of the formula Li$_x$M$_{1-y}$M'$_y$(XO$_4$)$_n$ in which x, y and n are numbers such as $0 \leq x \leq 2$, $0 \leq y \leq 0.6$, and $1 \leq n \leq 1.5$, M is a transition metal or a mixture of transition metals from the first line of the periodic table, M' is an element with fixed valency selected among Mg$^{2+}$, Ca$^{2+}$, Al$^{3+}$, Zn$^{2+}$ or a combination of these same elements and X is chosen among S, P and Si, by bringing into equilibrium, in the required proportions, a mixture (preferably intimate and/or homogeneous) comprising at least:
a) a source of M,
b) a source of an element M';
c) a compound that is a source of lithium; and
d) possibly a compound that is a source of X,
e) a source of carbon, called carbon conductor the sources of the elements M, M', Li and X may be introduced or not, in whole or in part, in at least one step, in the form of compounds having more than one source element, and the synthesis being carried out by thermodynamic or kinetic reaction and bringing into equilibrium, in the required proportions, the mixture of the source compounds (also called precursors) a) to d), with a gaseous atmosphere, in such a way as to cause an oxidation state of the transition metal to the desired valency preferably, this valency is equal to two for iron, manganese, cobalt and nickel, and three or four for titanium and vanadium) for the constitution of $Li_xM_{1-y}M'_y(XO_4)_n$, by controlling the composition of the said gaseous atmosphere, the temperature of the synthesis reaction step, and the amount of the source compound c) relative to the other source compounds a), b) and d).

the method comprising at least one pyrolysis step of the source compound e) such as to obtain a compound whose electronic conductivity, measured on a sample of powder compressed at a pressure of 3750 Kg·cm$^{-2}$, is greater than $10^{-8}$ S·cm$^{-1}$.

The conductivity measurement is carried out on powders of the sample. This powder (from 100 mg to about 1 g) is placed in a hollow cylindrical mold, 1.3 cm in diameter, made of poly(oxymethylene) (Delrin®)) and it is compacted between two stainless steel pistons with a laboratory press having a force of $5.10^3$ Kg, which corresponds to a pressure of 3750 Kg·cm$^{-2}$.

The conductivity measurement is carried out by using the pistons (plungers) as electrodes and using the complex impedance method known to the person skilled in the art. The conductivity is obtained from the resistance, using the formula $\rho=RS/l$ where R is the measured resistance, S is the surface (1.33 cm$^2$ for 1.3 cm diameter), l is the thickness of the sample and the resistivity is determined using the formula $\rho=RS/l$.

According to an advantageous variation, at least one part of the said transition metal or metals that constitutes M is in an oxidation state greater or less than that of the metal in the final compound $Li_xM_{1-y}M'_y(XO_4)_n$.

The synthesis reaction between the source compounds a) to d) is advantageously carried out simultaneously with the pyrolysis reaction of the source compound e).

According to a preferred embodiment of the synthesis according to the present invention, the pyrolysis reaction is carried out in a second step, consecutive to the synthesis reaction between the source compounds a) to d) and preferably in reducing or neutral gas atmosphere.

The synthesized compounds of the formula $C-Li_xM_{1-y}M'_y(XO_4)_n$ are advantageously obtained in the form of particles and in which the size and/or the shape of the particles of the compound $C-Li_xM_{1-y}M'_y(XO_4)_n$ is determined essentially by the size and the shape of the intimate and/or homogeneous mixture of the precursors used for the synthesis reaction, and more specifically by the size and/or the shape of the initial precursors M and M'. In this case, the size of the particles of compound $C-Li_xM_{1-y}M'_y(XO_4)_n$ obtained is between 0.1 and 10 micrometers.

Preferably, the size and the shape of the particles of compound $C-Li_xM_{1-y}M'_y(XO_4)_n$ do not differ by more than 80% from that of precursors a) to d), preferably in which the size and the shape of the particles of compound $C-Li_xM_{1-y}M'_y(XO_4)_n$ do not differ by more than 80% from that of precursor a) and if necessary, from that of precursor b).

According to an advantageous embodiment of this synthesis, the amount of carbon-source compound (called carbon conductor) is chosen in such a way as to coat at least a part of the surface of the particles of the compound of formula $Li_xM_{1-y}M'_y(XO_4)_n$ with carbon.

The amount of bound carbon is less than 5%, preferably less than 3%, of the mass of the compound of formula $Li_xM_{1-y}M'_y(XO_4)_n$.

Preferably, at least 30% of the surface of the particles of the compound of formula $Li_xM_{1-y}M'_y(XO_4)_n$ is covered with carbon.

According to another advantageous embodiment of the invention, the amount of carbon conductor source compound in the reaction medium is chosen in such a way as to bond the particles of compound $Li_xM_{1-y}M'_y(XO_4)_n$ with each other and to constitute agglomerates with sizes comprised between 1 and 20 microns. The amount of bound carbon is thus less than 7%, preferably less than 5%, of the mass of the compound of formula $Li_xM_{1-y}M'_y(XO_4)_n$.

The procedure according to the invention makes it possible to control the final form of the compound $C-Li_xM_{1-y}M'_y(XO_4)_n$ by choosing the form given to the mixture of precursors a) to d) before synthesis. Thus, a technique used to give a specific form to the mixture of precursors is advantageously chosen from among the techniques of spray-drying, precipitation, coprecipitation, agglomeration and/or pelletization.

When the technique used to give a specific form to the mixture of precursors is spray-drying, the final form of the compound $C-Li_xM_{1-y}M'_y(XO_4)_n$ that is obtained is spherical agglomerates with sizes comprised between 1 and 30 micrometers, said agglomerates being constituted of smaller particles of the compound of formula $C-Li_xM_{1-y}M'_y(XO_4)_n$.

According to a preferred method, the organic substance that is the source of the carbon conductor is selected from the group constituted by polymers and oligomers containing a carbon skeleton, simple carbohydrates or polymers and the aromatic hydrocarbons.

According to another preferred method, the carbon conductor source contains, in the same compound or in the mixture that makes up this source, oxygen and hydrogen that are bound chemically and from which pyrolysis locally releases carbon monoxide and/or carbon dioxide and/or hydrogen and water vapor that contributes, in addition to depositing carbon, to creating locally the reducing atmosphere required for synthesis of the material $Li_xM_{1-y}M'_y(XO_4)_n$.

Preferably, the conductor carbon source compound is mainly constituted by a block copolymer comprising at least one carbon source segment that can be pyrolyzed and a segment that is soluble in water and organic solvents in such a way as to allow its distribution, preferably homogeneously, throughout the compound $Li_xM_{1-y}M'_y(XO_4)_n$ or its precursors.

Advantageously, the organic carbon conductor source substance is at least one of the compounds of the group constituted by polyethylene, polypropylene, glucose, fructose, sucrose, xylose, sorbose, starch, cellulose and its esters, block polymers of ethylene and ethylene oxide and polymers of furfuryl alcohol.

According to an advantageous embodiment of the synthesis according to the present invention, the source compounds a) to d) are in the form of powder or at least partially compressed in the form of pastilles, prior to the synthesis (preferably carried out in continuous mode), in such a way as to increase the points of contact between the reagents and to increase the density of the final product while allowing the reaction with the gaseous phase.

The gaseous phase can circulate in the reactor in the same direction or preferably, counter-current to the precursor feed.

Preferably, the carbon conductor source compound is present at the time of the compacting step for the compounds a) to d).

The method of synthesis is preferably carried out continuously, preferably in a reactor that promotes the equilibrium of solid powders, agglomerated or not, with the gaseous phase, e.g. from among those reactors, rotary kilns, fluidized beds, belt-driven kilns, that allow control of the composition and the circulation of the gaseous atmosphere. In this case, the solid feed is greater than 1 kg/h, the temperatures are preferably between 650 and 800 degrees Celsius, the dwell time is preferably less than 5 hours, and even more preferably less than ½ hour.

The reduction is preferably obtained by the action of a reducing atmosphere chosen in such a way as to be able to reduce the oxidation state of the metallic ion M to the level required for the composition of the compound without reducing it to the neutral metallic state.

The reducing atmosphere advantageously contains hydrogen or a gas that is capable of generating hydrogen under the synthesis conditions, ammonia or a substance capable of generating ammonia under the synthesis conditions or carbon monoxide, these gases being used in their pure state or in mixtures and it also being possible to use them in the presence of water vapor and/or in the presence of carbon dioxide and/or in the presence of a neutral gas (such as nitrogen or argon).

According to another preferred embodiment, the reducing atmosphere is made up of a mixture of $CO/CO_2$ or $H_2/H_2O$, $NH_3/H_2O$ or a mixture of them, generating an oxygen equilibrium pressure less than or equal to that determined by the transition metal at the state of oxidation corresponding to the precursors introduced to form the compound $Li_xM_{1-y}M'_y(XO_4)_n$ but greater than that corresponding to the reduction of any one of the transition elements present in the metallic state, ensuring the thermodynamic stability of $Li_xM_{1-y}M'_y(XO_4)_n$ in the reaction mixture, independently of the synthesis reaction time.

Preferably, the gaseous atmosphere is made of a mixture of $CO/CO_2$ or $H_2/H_2O$, $NH_3/H_2O$ or a mixture of them, generating an oxygen equilibrium pressure greater than or equal to that determined by at least the transition elements, when the precursor is introduced in the metallic form, to form the compound $Li_xM_{1-y}M'_y(XO_4)_n$, but greater than that corresponding to a superoxidation of the transition elements beyond their assigned valence in $Li_xM_{1-y}M'_y(XO_4)_n$, ensuring the thermodynamic stability of $Li_xM_{1-y}M'_y(XO_4)_n$ in the reaction mixture, independently of the synthesis reaction time.

The reducing atmosphere is preferably made up of a mixture of $CO/CO_2$, $H_2/H_2O$, $NH_3/H_2O$ or a mixture of them, generating an oxygen equilibrium pressure less than or equal to that determined by one of the transition metals present in $Li_xM_{1-y}M'_y(XO_4)_n$, possibly being able to lead to a reduction of at least this transition element to the metallic state. the compound $Li_xM_{1-y}M'_y(XO_4)_n$ being obtained by controlling the temperature and the contact time with the gaseous phase or the proportion of the precursor c) in the reaction mixture; the synthesis temperature preferably being comprised between 200 and 1200° C., still more preferably between 500 and 800° C. and the time of contact between the reaction mixture and the gaseous phase preferably being comprised between 2 minutes and 5 hours and still more preferably between 10 and 60 minutes.

The gaseous reducing atmosphere can advantageously be obtained by decomposition, in a vacuum or in an inert atmosphere, of an organic compound or of a mixture of organic compounds containing at least hydrogen and oxygen, bound chemically, and of which the pyrolysis generates carbon monoxide and/or a mixture of carbon dioxide and monoxide, of hydrogen and/or a mixture of hydrogen and water vapor that is able to carry out the reduction that leads to the formation of the compound $Li_xM_{1-y}M'_y(XO_4)_n$.

According to a preferred variation, the gaseous reducing atmosphere is obtained by partial oxidation by oxygen or by air, of a hydrocarbon and/or of carbon, possibly in the presence of water vapor (preferably water vapor and in an amount between 0.1 and 10 molecules, inclusively, of $H_2O$ per atom of carbon in the hydrocarbon) at an elevated temperature (preferably between 400 and 1200° C.), making possible the formation of carbon monoxide or hydrogen or of a mixture of carbon monoxide and hydrogen.

The gaseous phase is made up of a gas that is reformed in-situ or ex-situ. In this case, the reformed gas atmosphere is obtained from methane, from propane, from a natural gas or from a mixture of these, with the addition of air and possibly of water vapor at a predetermined partial pressure, by condensation or injection into the reformed mixture.

Thermal processing (which includes the reaction for formation of $Li_xM_{1-y}M'_y(XO_4)_n$ and reduction and pyrolysis, and possibly dehydration of one or several of sources a) to d)) is carried out by heating from normal temperature to a temperature between 500 and 1100° C. The maximum temperature reached is preferably between 500 and 800° C.

According to an advantageous method for carrying out the synthesis, the dwell time of the reagents in the thermal processing step is less than 5 hours, preferably less than 1 hour.

The synthesis according to the present invention makes it possible to prepare the compound of formula $Li_xM_{1-y}M'_y(XO_4)_n$, in which n=1, with an electrochemical capacity greater than 150 $mAh/g^{-1}$, measured for specific intensities greater than 10 $mA \cdot g^{-1}$.

According to an advantageous method, the source of M is also the source of X and/or the source of M' is also the source of X and/or the source of lithium is also the source of X and/or the source of X is also the source of lithium.

Bringing the mixture of precursors a) to d) to equilibrium is facilitated in the form of an intimate and/or homogeneous mixture of the solid phase and the gaseous phase.

Preferably the transition metal or metals is (are) chosen at least partially from the group constituted by iron, manganese, cobalt and nickel, the complement for the transition metals preferably being chosen from the group made up of vanadium, titanium, chromium and copper.

Advantageously, the compound that is the source of M is in an oxidation state that can vary from 3 to 7.

Preferably, the compound that is the source of M is iron (III) oxide or magnetite, manganese dioxide, di-vanadium pentoxide, trivalent ferric phosphate, ferric hydroxyphosphate and lithium or trivalent ferric nitrate or a mixture of the latter.

Advantageously, the compound that is the source of lithium is chosen from the group constituted of lithium oxide or lithium hydroxide, lithium carbonate, the neutral phosphate $Li_3PO_4$ the acid phosphate $LiH_2PO_4$ the orthosilicates, the metasilicates or the polysilicates of lithium, lithium sulfate, lithium oxalate and lithium acetate or a mixture of the latter. The compound that is the source of lithium is lithium carbonate of the formula $Li_2CO_3$.

The source of X is chosen from the group constituted by sulfuric acid, lithium sulfate, phosphoric acid and its esters, the neutral phosphate $Li_3PO_4$ or the acid phosphate $LiH_2PO_4$, the monoammonium or diammonium phosphates, trivalent ferric phosphate, manganese and ammonium phosphate ($NH_4MnPO_4$), silica, lithium silicates, alkoxysilanes and their partial hydrolysis products and mixtures of these. The compound that is the precursor of X is preferably ferric phosphate, anhydrous or hydrated.

The procedure according to the invention makes possible, in particular, the advantageous synthesis of one or several lithium derivatives of the formula $LiFePO_4$, $LiFe_{1-s}Mn_sPO_4$ wherein $0 \leq s \leq 0.9$, $LiFe_{1-y}Mg_yPO_4$ and $LiFe_{1-y}Ca_yPO_4$ wherein $0 \leq y \leq 0.3$, $LiFe_{1-s-y}Mn_sMg_yPO_4$ wherein $0 \leq s \leq 1$ and $0 \leq y \leq 0.2$, $Li_{1+x}FeP_{1-x}Si_xO_4$ wherein $0 \leq x \leq 0.9$, $Li_{1+x}Fe_{1-s}Mn_sP_{1-x}Si_xO$ wherein $0 \leq s \leq 1$, $Li_{1+z}Fe_{1-s-z}Mn_sP_{1-z}S_zO_4$ wherein $0 \leq s \leq 1$, $0 \leq z \leq 0.2$, $Li_{1+2q}Fe_{1-s-q}Mn_sPO_4$ wherein $0 \leq s \leq 1$, and $0 \leq q \leq 0.3$, $Li_{1+r}Fe_{1-s}Mn_s(S_{1-r}P_rO_4)_{1,5}$ wherein $0 \leq r \leq 1$, $0 \leq s,t \leq 1$ and $Li_{0,5+u}Fe_{1-t}Ti_1(PO_4)_{1,5}$ wherein $0 \leq t \leq 1$ and wherein $0 \leq u \leq 1.5$.

Advantageously, the synthesis is used for compounds of the formula $Li_xM_{1-y}M'_y(XO_4)_n$ that have an olivine or Nasicon structure. including the monoclinic form.

The reaction parameters, and in particular the kinetics of the reduction by the gaseous phase, are advantageously chosen in such a way that the carbon conductor will not be consumed in the reduction process.

The amount of substance that is the carbon conductor source, present in the reaction medium subjected to reduction, is chosen such that the amount of carbon conductor in the reaction medium will preferably be between 0.1 and 25%, and still more preferably it will be between 0.3 and 1.5% of the total mass of the reaction mixture.

The temperature and duration of the synthesis are chosen as a function of the nature of the transition metal, i.e. above a minimum temperature at which the reactive atmosphere is capable of reducing the transition element or elements to their oxidation state required in the compound $Li_xM_{1-y}M'_y(XO_4)$ and below a temperature or a time leading to a reduction of the transition element or elements to the metallic state or an oxidation of the carbon resulting from pyrolysis of the organic substance.

The thermal processing is preferably carried out by heating from the normal temperature to a temperature comprised between 500 and 1100° C., in the presence of a reducing atmosphere. Advantageously, the maximum temperature reached is between 500 and 800° C.

According to another advantageous method, the compound $Li_xM_{1-y}M'_y(XO_4)_n$ is $LiMPO_4$, in which the amount of carbon conductor after pyrolysis is comprised between 0.1 and 10% by mass in comparison to the mass of the compound $LiMPO_4$.

The compound that is the source of carbon is preferably chosen in such a way that it is easily dispersible at the time of the processing used to insure an intimate mixture with precursors a) to d) by agitation and/or by solubilization, by mechanical grinding and/or by ultrasound homogenizing in the presence, or not, of a liquid or by spray-drying of a solution of one or several precursors and/or of a suspension and/or of an emulsion.

The synthesis is especially productive for preparation of the compound obtained with the formula $LiFePO_4$.

The core of the particles obtained is essentially (preferably at least 95%) constituted by a compound of the formula $LiFePO_4$, the complement advantageously being essentially constituted by compounds having a structure close to $LiFePO_4$ and in which the material obtained preferably has an amount of carbon conductor comprised between 0.2 and 5% in comparison to the mass of the particles obtained.

A second object of the invention consists of a material made of particles having a core and/or a coating and/or a cross-linking, the said core comprising at least one compound of the formula $C-Li_xM_{1-y}M'_y(XO_4)_n$, in which C represents carbon cross-linked to the compound $Li_xM_{1-y}M'_y(XO_4)_n$, x, y and n are numbers such as $0 \leq x \leq 2$, $0 \leq y \leq 0.6$, and $1 \leq n \leq 1.5$, M is a transition metal or a mixture of transition metals from the first line of the periodic table, M' is an element with fixed valency chosen from among $Mg^{2+}$, $Ca^{2+}$, $Al^{3+}$, $Zn^{2+}$ and X is chosen from among S, P and Si, the said materials having a conductivity greater than $10^{-8}$ Scm$^{-1}$, on a sample of powder compacted at more than 3000 Kg·cm$^{-2}$ preferably at 3750 Kg·cm$^{-2}$ and of which the granulometry is preferably comprised between 0.05 and 15 micrometers, preferably between 0.1 and 10 micrometers.

These granulometry values include agglomerates of finer particles, possibly connected to each other by friction or cross-linked to each other by the carbon conductor and forming entities, preferably quasi-spherical.

According to another embodiment., this object consists of a material that can be obtained by a procedure according to the synthesis according to the first object of the invention, having a core and a coating and/or cross-linking, the said material having:

a conductivity, measured on a sample of powder compacted at 3750 Kg·cm$^{-2}$ that is greater than $10^{-8}$ S·cm$^{-1}$;
an amount of carbon conductor comprised between 0.2 and 5%; preferably between 0.3 and 2%; and
a granulometry that is preferably comprised between 0.05 and 15 micrometers, preferably between 0.1 to 10 micrometers.

These granulometry values include agglomerates of finer particles, possibly bound to each other by sintering or cross-linked to each other by the carbon conductor and forming entities, preferably quasi-spherical.

A third object of the present application consists of an electrochemical cell comprising at least two electrodes and at least one electrolyte, characterized in that at least one of these electrodes contains at least one of the materials according to the second object of the present invention.

According to one advantageous method, the electrolyte is a polymer, solvating or not, optionally plasticized or gelled by a polar liquid containing one or more metallic salts in solution.

The electrolyte is a polar liquid immobilized in a microporous separator and containing one or several metallic salts in solution. Preferably at least one of these metallic salts is a lithium salt.

According to another advantageous method, at least one of the negative electrodes is made of metallic lithium, a lithium alloy, especially with aluminum, antimony, zinc, tin, possibly in nanomolecular mixture with lithium oxide or a carbon insertion compound, especially graphite, a double nitride of lithium and iron, cobalt or manganese, a lithium titanate of the formula $Li_xTi_{(5+3y)/4}O_4$, where $1 \leq x \leq (11-3y)/4$ (or) where $0 \leq y \leq 1$.

Advantageously, one of the positive electrodes contains one of the products obtainable by a method according to the invention, used alone or in mixture with a double oxide of cobalt and lithium or with a complex oxide of the formula $Li_xNi_{1-y-z-q-r}Co_yMg_zAl_rO_2$ wherein $0.1 \leq x \leq 1$, $0 \leq y$, z and $r \leq 0.3$, or with a complex oxide of the formula $Li_xMn_{1-y-z-q-r}Co_yMg_zAlrO_2\text{-}qF_q$ wherein $0.05 \leq x \leq 1$ and $0 \leq y$, z,r,q$\leq 0.3$.

The polymer used to bond the electrodes or as electrolytes is advantageously a polyether, a polyester, a polymer based on methyl methacrylate units, an acrylonitrile-based polymer and/or a vinylidene fluoride or a mixture of the latter.

The cell can comprise a non-protogenic solvent that contains, e.g. ethylene or propylene carbonate, an alkyl carbonate having 1 to 4 carbon atoms, γ-butyrolactone, a tetraalkylsulfamide, an α-ω dialkyl ether of a mono-, di-, tri-, tetra- or oligo-ethylene glycol with molecular weight less than or equal to 5000,. as well as mixtures of the above-mentioned solvents.

The cell according to the present invention preferably functions as a primary or secondary generator, as a super-capacity or as a light modulation system.

Advantageously, the cell according to the invention functions as a super-capacity in that the positive electrode material is the second object of the invention and the negative electrode is a carbon with a specific surface area greater than 1 $m^2 \cdot g^{-1}$, preferably greater than 5 $m^2 \cdot g^{-1}$, in the form of powder, fiber or mesoporous composite of a carbon-carbon composite type.

The electrochemical cell can also function as a light modulation system and in this case, the optically inactive counter-electrode is a material according to the second object of the invention, spread in a thin layer on a transparent conductor support of a glass or polymer type covered with doped tin oxide ($SnO_2$:Sb or $SnO_2$:F) or doped indium oxide ($In_2O_3$: Sn).

Preferred Methods

The proposed invention relates to a new method for simplified synthesis of $Li_xMXO_4$ compounds with olivine structure obtained by reduction of a mixture, in which at least a part of the transition metal M is in an oxidation state higher than that of the final compound $LiMPO_4$. Another surprising advantage of the present invention is to also be compatible with the synthesis described in CA-A-2,270,771, which leads to optimized performance. In this case, the organic compound that is the source of carbon is added to the mixture of initial reagents containing at least one part of transition metal in an oxidation state higher than that of the lithium compound $LiMPO_4$ and the simplified synthesis leads directly to the material covered in carbon in a low amount without the latter being oxidized by the reduction of the metal with higher oxidation state. The simplification involves, in particular, the reduction in the number of steps and above all, in the number of steps where control of the atmosphere is necessary. Reference can be made to "Modern Batteries", by C. A. Vincent & B. Scrosati, Arnold publishers, London, Sydney, Auckland, (1997).

The improvements also relate to the reproducibility of the synthesis, to the control of the size and distribution of the particles and to the reduction in the number and cost of initial reagents and naturally of the final material. This synthesis, when combined with the teachings of CA-A-2,270,771, also makes it possible to control the amount of carbon in the final material.

We are reporting here, for the first time, the synthesis of a $Li_xMXO_4$ compound of olivine type, in this case $LiFePO_4$, produced by reduction by a gaseous phase of an iron (III) salt. Since the initial salts are no longer very sensitive to oxidation, the synthesis process is greatly simplified. In addition, the possible use of $Fe_2O_3$ as a source of iron considerably reduces the cost of synthesizing $LiFePO_4$. This material would thus be preferable to other cathode materials for lithium batteries, such as cobalt or nickel oxide in the case of lithium-ion batteries, or vanadium oxides $V_2O_5$ or analogs that are less inoffensive to the environment.

$LiFePO_4$ can be prepared using an iron (III) salt that is stable in air, e.g. $FePO_4 \cdot 2H_2O$ or $Fe_2O_3$ or any other source of iron (III). The lithium source would be e.g. $Li_2CO_3$ in the first case, or LiOH. $LiH_2PO_4$ or $Li_3PO_4$ would be used as a source of both lithium and phosphorus in the second case. The stoichiometric mixtures, as well as the carbon precursor, are processed at 700° C. for 4 hours with scavenging by an excess of reducing atmosphere in such a way as to reduce the oxidation state of the iron. The choice of the synthesis atmosphere and temperature is very important in order to be able to reduce the iron (III) to iron (II) without the gaseous atmosphere or the carbon present being able to reduce the iron to the metallic state. The latter will preferably, but in a non-limiting manner, be made up e.g. of hydrogen, ammonia, of a gaseous mixture capable of supplying hydrogen under the synthesis conditions. the hydrogen being able to be used pure or diluted in a dry or hydrated inert gas, carbon monoxide. possibly mixed with carbon dioxide and/or a dry or hydrated neutral gas. The maximum thermal processing temperature is chosen such that the carbon present will be thermodynamically stable with respect to the iron (II) and preferably with respect to the gaseous phase. In the case of iron, the limit temperature zone is between 500 and 800° C., preferably around 700° C. Beyond these temperatures, the carbon becomes reducing enough to reduce the iron (II) to metallic iron. In the case of other transition metals, any person skilled in the art would be able to use Ellingham curves to adapt the temperature and the nature of the gaseous atmosphere in order to obtain an equivalent result.

An unexpected and surprising aspect of the invention that is advantageous is the relative chemical inertia of the carbon deposited on the surface of the material with respect to reactions that make it possible to reduce the degree of oxidation of the transition metal, in particular, of iron. From a thermodynamic point of view, the carbon formed by decomposition of the pyrolyzed organic substance has a reducing power that is adequate to oxidize into $CO_2$ or CO and to reduce, even in an inert atmosphere, Iron (III) to Iron (II), which would make controlling the amount of carbon in the final product difficult, especially at the low amounts of carbon used in the present invention. The inventors have noted that the reduction reaction was essentially due to the action of the reducing gas atmosphere, of which the kinetics are faster than those due to the action of the carbon deposited on the surface, in spite of intimate contact between the two solid phases (carbon and redox material). By using a reducing atmosphere, preferably based on hydrogen, ammonia or carbon monoxide, the reduction of the iron by the solid carbon is not promoted kinetically and the Iron (III) is reduced to Iron (II) mainly by reaction with the reducing atmosphere. The amount of carbon in the final product thus essentially corresponds to the decomposition yield of the organic substance, which makes it possible to control this amount.

A surprising effect of the present invention, using an equilibrated reaction in the gaseous phase and the solid reagents, is to be able to obtain the compound C-liM'M"$(XO)_n$ using iron in a state of oxidation by using gaseous mixtures of $CO/CO_2$.

The following examples are given to better illustrate the present invention, but they should not be interpreted as constituting a limitation to the scope of the present invention.

EXAMPLES

Example 1

Synthesis of $LiFePO_4$ Using Iron Phosphate in Reducing Atmosphere $LiFePO_4$ was prepared by reaction of $FePO_4 \cdot 2H_2O$ and $Li_2CO_3$ in the presence of hydrogen. In a first step, stoichiometric quantities of the two compounds are ground together in isopropanol, then heated progressively (6 C per minute up to 700° C.) in a tube kiln under reducing gas scavenging (8% hydrogen in argon). This temperature is maintained for one hour. The sample is cooled for 40 minutes, which would be with a cooling speed of around 15° C. per minute.

The reducing gas flow is maintained during the entire thermal processing time and also during the temperature drop. The total thermal processing time is around 3 and a half hours.

The structure of the sample was verified by X-ray diffraction and the rays correspond to those of the pure triphylite $LiFePO_4$ and the electronic conduction of the $LiFePO_4$ powder thus obtained, compressed at 5 tons for 1.3 cm diameter, is too low to be measured.

Example 1'

Preparation of $LiFePO_4$ Coated with Carbon Synthesized Using the Sample Prepared in Example 1

The triphylite obtained in example I is impregnated with a solution of cellulose acetate (39.7% by weight of acetyl, average molecular weight $M_w$ of 50.000) in acetone. The quantity of cellulose acetate added represents 5% of the weight of the triphylite processed. The use of a carbon precursor in solution makes possible a perfect distribution over the particles of triphylite. After drying, the mixture is placed in the kiln described above under scavenging by an argon atmosphere. The temperature is increased by 6° C. per minute up to 700° C. The latter temperature is maintained for one hour. The sample is then cooled progressively, still under argon scavenging. This sample contains 1% by weight of carbon, which corresponds to a carbonization yield of the cellulose acetate of 20%.

The material exhibits electronic surface conductivity. The latter was measured on a pastille of compacted powder. A force of 5 tons is applied at the time of measurement on a sample that is 1.3 cm in diameter. Under these conditions, the electronic conductivity measured is $5.10^{-5}$ S·cm$^{-1}$.

Example 1"

Comparison of the Electrochemical Behavior of Materials Prepared in Examples 1 and 1' in Electrochemical Cells The materials prepared in example 1 and 1' were tested in button-type CR 2032 cells of lithium polymer batteries at 80° C. The cathodes were prepared by mixing the powder of the active material with carbon black (Ketjenblack®) to insure electronic exchange with the current collector and poly(ethylene oxide) with mass 400,000 used as the binding agent on one hand, and ionic conductor on the other. The proportions by weight are 51:7:42. Acetonitrile is added to the mixture to dissolve the poly(ethylene oxide) in a quantity that is adequate to form a homogeneous suspension. This suspension is then dripped onto a 1 cm$^2$ stainless steel disk. The cathode thus prepared is dried in a vacuum, then transferred in a glove box under helium atmosphere (<1 ppm $H_2O$, $O_2$). A sheet of lithium (27 μm thick) laminated on a nickel substrate was used as the anode. The polymer electrolyte was made of poly(ethylene oxide) with mass 5,000,000 and a bistrifluorosulfonimide lithium salt $Li[(CF_3SO_2)_2N])$ (hereinafter referred to as LiTFSI) in oxygen proportions of oxyethylene units/lithium ions of 20:1.

Electrochemical experiments where carried out at 80° C., the temperature at which the ionic conductivity of the electrolyte is adequate ($2 \times 10^{-3}$ Scm$^{-1}$).

FIG. 1 shows the first cycle obtained by slow voltametry, a technique well known to the person skilled in the art (20 mV·h$^{-1}$), controlled by a Macpile® model battery cycler (Biologic™, Claix, France), of the samples prepared in example 1 and 1'.

The non-carbonated compound in example 1 presents the oxidoreduction peaks characteristic of $LiFePO_4$. The capacity exchanged at the time of the reduction process represents 74% of the theoretical value. The reaction kinetics are slow and the discharge extends to 3 volts. These capacity and kinetic limitations of the reactions are currently observed for the samples of non-carbonated $LiFePO_4$. The carbonated compound from example 1' shows well-defined oxidoreduction peaks and reaction kinetics that are much more rapid than those of the material resulting from the synthesis described in example 1. The capacity achieved in discharge is 87% of the theoretical value, which represents an improvement in the electrochemical generator capacity of 17% in comparison to that of the non-carbonated sample in example 1.

Example 2

Synthesis of Carbonated $LiFePO_4$ in One Step Using Iron Phosphate in Reducing Atmosphere Carbonated $LiFePO_4$ was prepared by reducing reaction of $FePO_4.2H_2O$ and $Li_2CO_3$ in the presence of hydrogen. In a first step, the stoichiometric quantities of the two compounds, as well as the carbon source, (cellulose acetate, 39.7% by weight of acetyl, average molecular weight $M_w$ of 50,000) in low proportion (5% by weight in comparison to the weight of $FePO_4$ $2H_2O$, i.e. 4.2% in comparison to the weight of the mixture of $FePO_4.2H_2O$ and $Li_2CO_3$) are crushed together in isopropanol. The solvent is evaporated and the mixture subjected to the thermal processing described in examples 1 and 1'. Throughout the entire thermal processing and also at the time of the temperature drop, the reducing atmosphere is applied by a scavenging of a mixture of 8% hydrogen in the argon.

The structure of the sample was verified using X-ray diffraction and the rays correspond to those of pure triphylite $LiFePO_4$.

Figure 2:
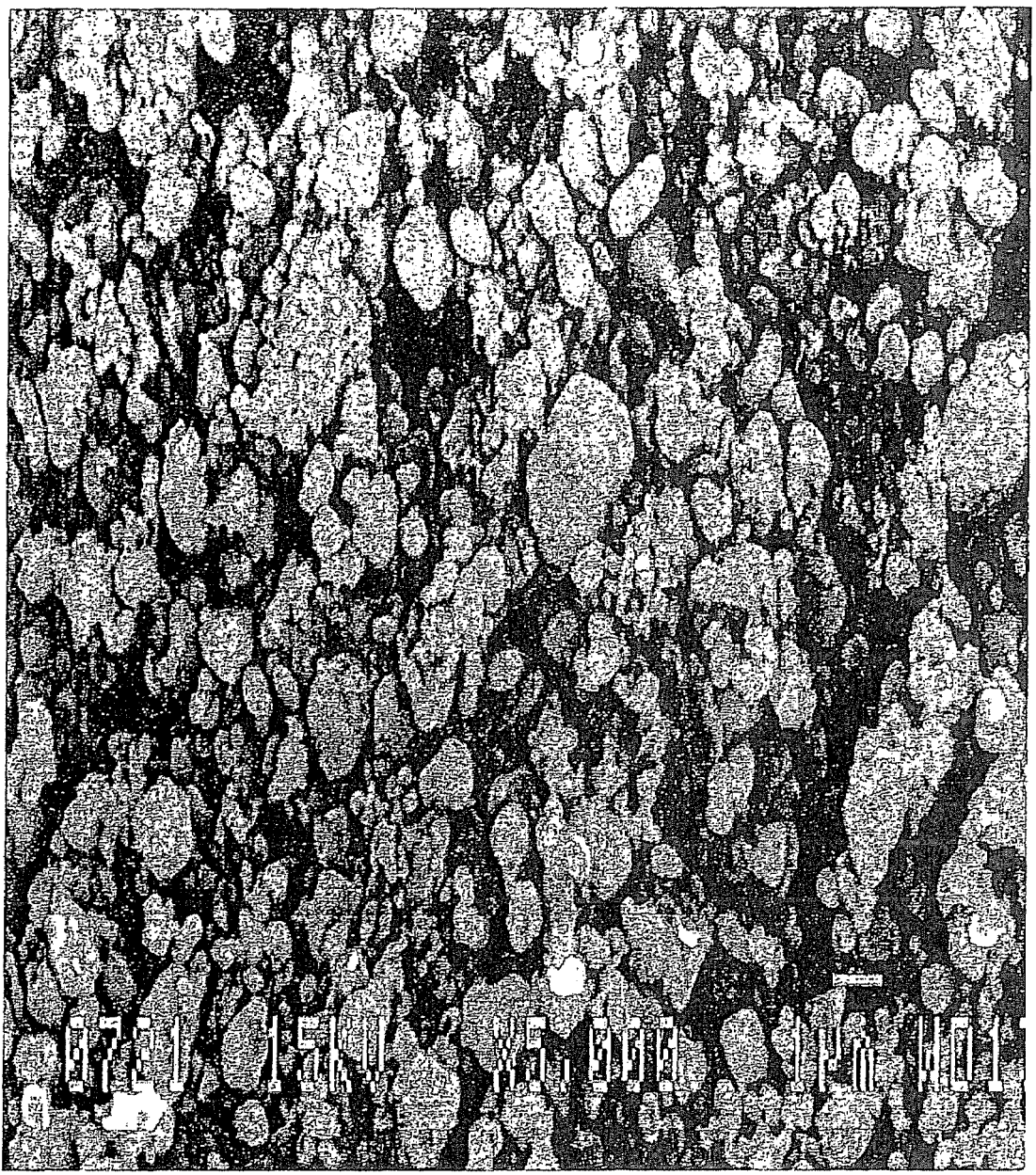
FIG. 2: Morphology of carbonated LiFePO$_4$ synthesized using FePO$_4$.2H$_2$O (reduction by hydrogen). Micrograph taken on a scanning electron microscope with 5000× magnification.

The sample prepared is made up of very fine particles on the order of a micron (FIG. 2). These particles are covered with a fine layer of carbon, of which the weight represents 1.2% of the total weight of the sample, measured by gravimetry after dissolving the core of $LiFePO_4$ in 2M hydrochloric acid.

The material exhibits electronic surface conductivity. The latter was measured according to the procedure described in example 1'. Under these conditions, the electronic conductivity measured is $2.10^{-3}$ S·cm$^{-1}$.

Taking into account the residual quantity of carbon in the sample, the carbonating yield of the cellulose acetate at the time of synthesis is 20%. It is important to note that this yield is identical to that obtained in example 1', where the triphylite $LiFePO_4$ is already formed and no reducing step is necessary. Thus it is evident that the carbon that comes from decomposition of the cellulose acetate is not consumed and does not interfere in the reaction that reduces iron (III) to iron (II). Thus this reduction is carried out by means of the gaseous phase.

Example 2'

Comparison of the Electrochemical Behavior of the Carbonated Triphylite LiFePO$_4$ Prepared in Example 1 to that of a Sample of Carbonated Triphylite Synthesized by Another Method The material prepared in example 2 was tested in CR 2032 button cells described in example 1". For comparison, wve also are reporting several results obtained for the best carbonated sample synthesized using iron (II) (vivianite Fe$_3$(PO$_4$)$_2$.8H$_2$O), the synthesis of which has already been described in CA-A-2,270,771.

Figure 3:
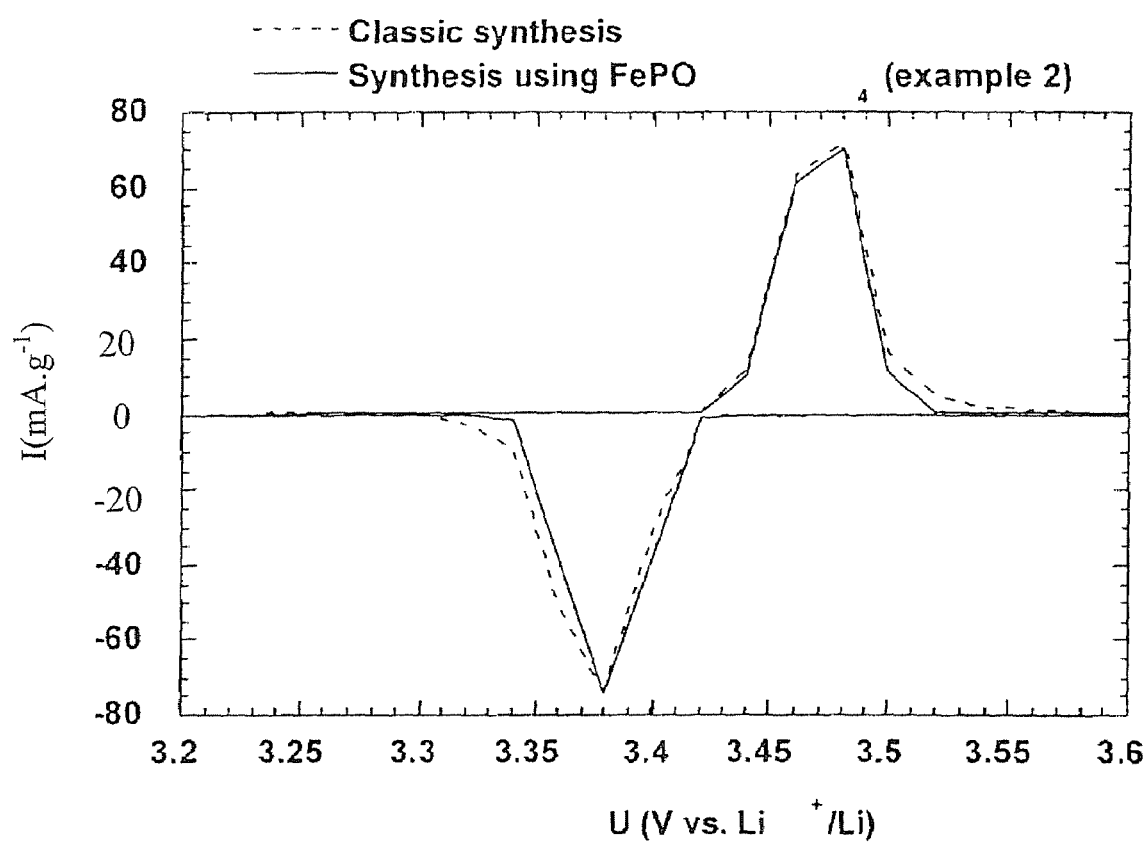
FIG. 3: 5th cycle obtained by slow voltametry (v=20 mV·h$^{-1}$) at 80° C. of a battery containing carbonated LiFePO$_4$, synthesized using FePO$_4$.2H$_2$O (reduction by hydrogen) (solid lines) compared to the LiFePO4 obtained according to CA-A-2,270,771 followed by a carbon deposition step (dotted lines).

FIG. 3 presents the 5$^{th}$ cycle obtained by slow voltametry (20 mV·h$^{-1}$) controlled by a battery cycler of the Macpile® type with the sample resulting from classic synthesis (dotted lines) on one hand, to that obtained in example 2 (solid lines) on the other. The two syntheses lead to samples having the same electrochemical behavior on the level of oxidoreduction potentials and electrochemical kinetics.

Figure 4:
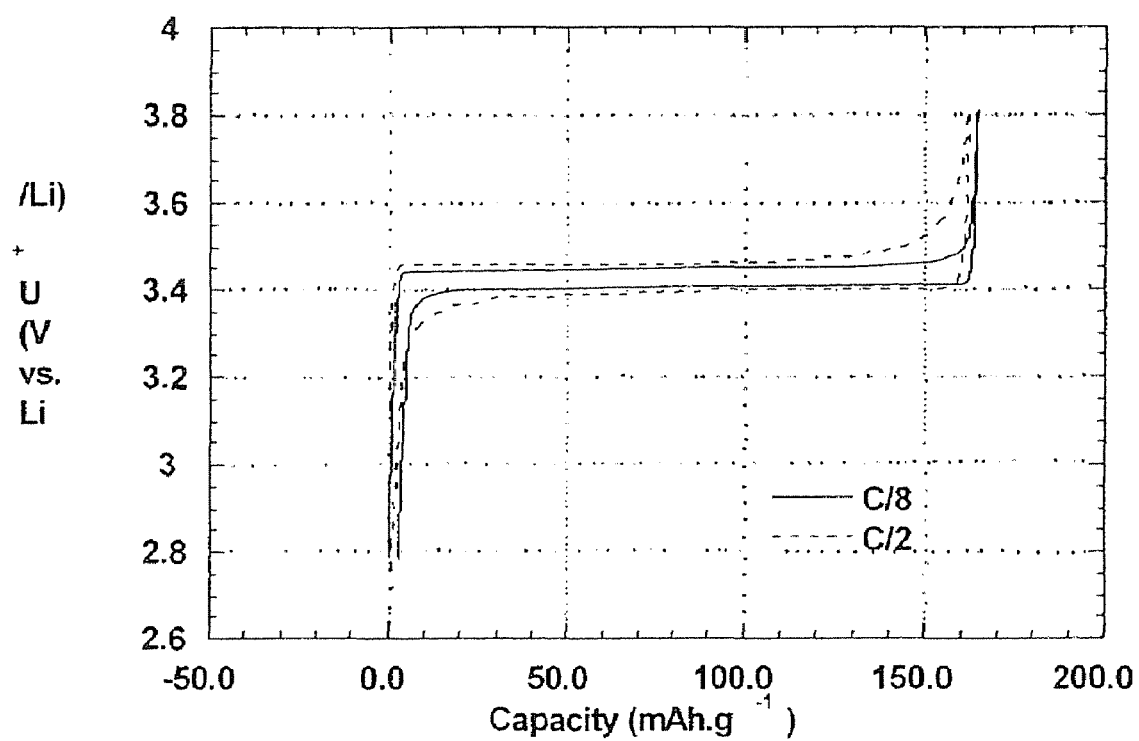
FIG. 4: Profiles of charging and discharging carried out in galvanostatic mode at 80° C. and at two charging and discharging speeds (C/8: solid lines and C/2: dotted lines) for batteries containing carbonated LiFePO$_4$ synthesized using FePO$_4$.2H$_2$O (reduction by hydrogen).

The charging and discharging profiles of batteries assembled With the sample resulting from the synthesis described in example 2 are presented in FIG. 4 for two loads. These results are obtained in galvanostatic mode between 2.8 and 3.8 volts for two charging and discharging speeds C/8 and C/2 (the current applied (expressed in mA) at the time of charging or discharging corresponds to ⅛ (respectively ½) of the theoretical capacity of the battery expressed in mAh). We have reported the 20$^{th}$ cycle and in the two cases, the discharge plateau is flat and the capacities involved correspond to 95% of the theoretical capacity.

Figure 5:
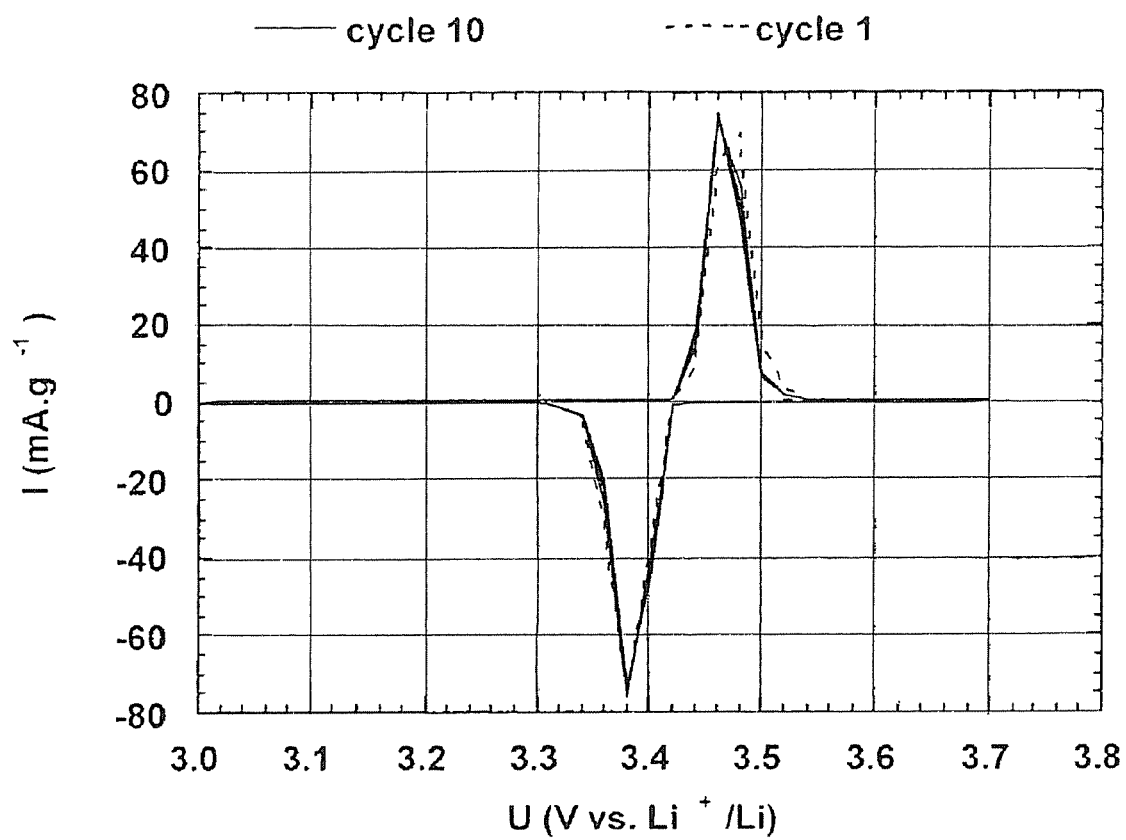
FIG. 5: Trend in the cycling capacity of a battery containing carbonated LiFePO$_4$ synthesized using FePO$_4$.2H$_2$O according to example 2 (reduction by hydrogen)—slow voltametry (v=20 mV·h$^{-1}$) at 80° C. of a battery containing LiFePO$_4$ synthesized using FePO$_4$.2H$_2$O (reduction by carbon).

The trend in capacities observed in discharging at the time of cycling during discharging is represented in FIG. 5. In both cases, the initial capacity is around 80% of the theoretical capacity but, after around ten cycles, it is greater than 95%, i.e. at 160 mAh·g$^{-1}$, and remains stable for the duration of the experiment. These results are comparable to those obtained with classic synthesis (reaction of divalent iron phosphate (vivianite) with lithium phosphate).

Example 3

Control of the Carbon Quantity

Samples of triphylite with different amounts of carbon were prepared by reaction of FePO$_4$.2H$_2$O and Li$_2$CO$_3$ in the presence of a 1:1 mixture by volume of CO/CO$_2$. This atmosphere was chosen for its reducing power with respect to iron (III) while maintaining a stability of the iron (II), in particular at the end of the cycle for the rise to the synthesis temperature at 700° C. In a first step, the stoichiometric quantities of the two compounds, as well as the cellulose acetate, are ground together in isopropanol. The cellulose acetate quantities added represent 2, 4 and 5%, respectively, of the mixture weight. After drying, these mixtures are heated progressively (6° C. per minute up to 700° C.) in a tube kiln with scavenging of the reducing gas (CO/CO$_2$: 1/1). This temperature is maintained for one hour. The sample is cooled for 40 minutes, which would be with a cooling speed of around 15° C. per minute. The reducing gas flow is maintained during the entire thermal processing time and also during the temperature drop. The total thermal processing time is around three and a half hours.

The structure of the samples was verified using X-ray diffraction and in all cases, the rays correspond to those of pure triphylite LiFePO$_4$.

The amounts of carbon were determined by elementary analysis. The results, as well as the electronic conductivities, of the samples are shown in Table 1.

TABLE 1

| % Cellulose acetate | Amount of C | Yield (C) | Conductivity |
| --- | --- | --- | --- |
| 2 | 0.62 | 0.22 | $2.10^{-6}$ S.cm$^{-1}$ |
| 4 | 1.13 | 0.2 | $1.10^{-3}$ S.cm$^{-1}$ |
| 5 | 1.35 | 0.19 | $4.10^{-2}$ S.cm$^{-1}$ |

In the three cases. the carbonization yield (yield (C) of table 1 for cellulose acetate) is close to 20%.

The residual carbon quantity has a significant influence on the electronic conductivity.

As can be seen, the quantities of carbon conductor are proportional to the quantity of precursor added (cellulose acetate). This demonstrates, in a formal way, that the carbon conductor does not participate in the reduction of iron (III) in the presence of reducing gas atmosphere. the latter reducing the iron compound with more rapid kinetics.

Example 3'

Comparison of Electrochemical Behavior of the Samples of Carbonated Triphylite Prepared in Example 3

The materials prepared in example 3 were tested in CR 2032 button cells described in example 1".

Figure 6:
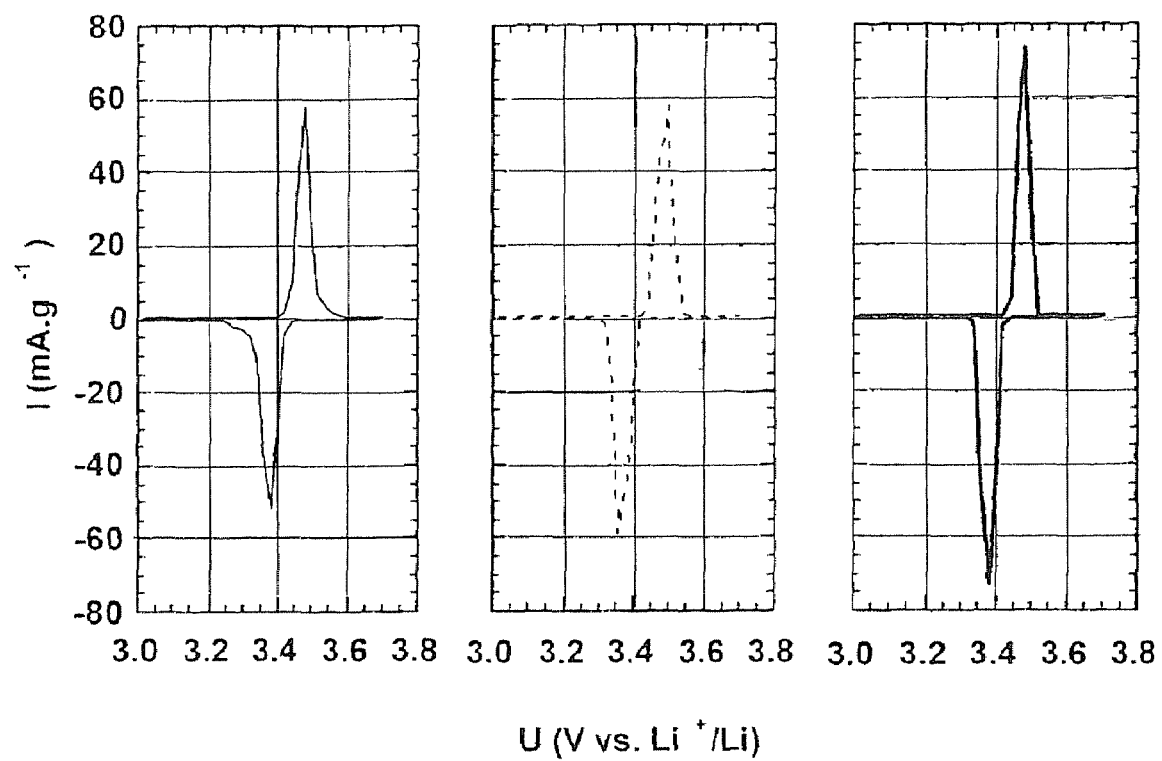
FIG. 6: 5th cycle obtained by slow voltametry (v=20 mV·h$^{-1}$) at 80° C. of batteries containing carbonated LiFePO$_4$ synthesized using FePO$_4$.2H$_2$O (reduction by 1:1 CO/CO$_2$) for samples containing different carbon percentages (0.62%: solid lines, 1.13% dotted lines, 1.35% bold lines).

FIG. 6 shows the 5$^{th}$ cycle obtained by slow voltametry (20 mV·h$^{-1}$) controlled by a battery cycler of the Macpile® type with:

the sample containing 0.62% carbon (solid lines)
the sample containing 1.13% carbon (dotted lines)
the sample containing 1.35% carbon (bold lines)

The main characteristics of the electrochemical behavior of these samples are summarized in Table 2 below:

TABLE 2

| % Carbon | 0.62 | 1.13 | 1.35 |
| --- | --- | --- | --- |
| Capacity (mAh.g$^{-1}$) | 150 | 160 | 163 |
| % Theoretical capacity | 88 | 94 | 96 |
| I peak (mA) | 52 | 60 | 73 |

The residual carbon quantity has an important influence on the capacity of the samples. In addition the increase in the peak current with the amount of carbon indicates an improvement in the reaction kinetics. The latter reflects the increase in electronic conductivity with the amount of carbon explained in example 3.

The synthesis method described in example 3 makes it possible to reliably and reproducibly control the amount of carbon in the final material. This is essential. taking into account the influence of the amount of carbon on the electrochemical properties.

Examples 4 and 4' (Demonstration of Coating Power of the Polyethylene-Type Carbon Additive and of the Control of the Size of Particles by Coating)

Example 4

Figure 7:
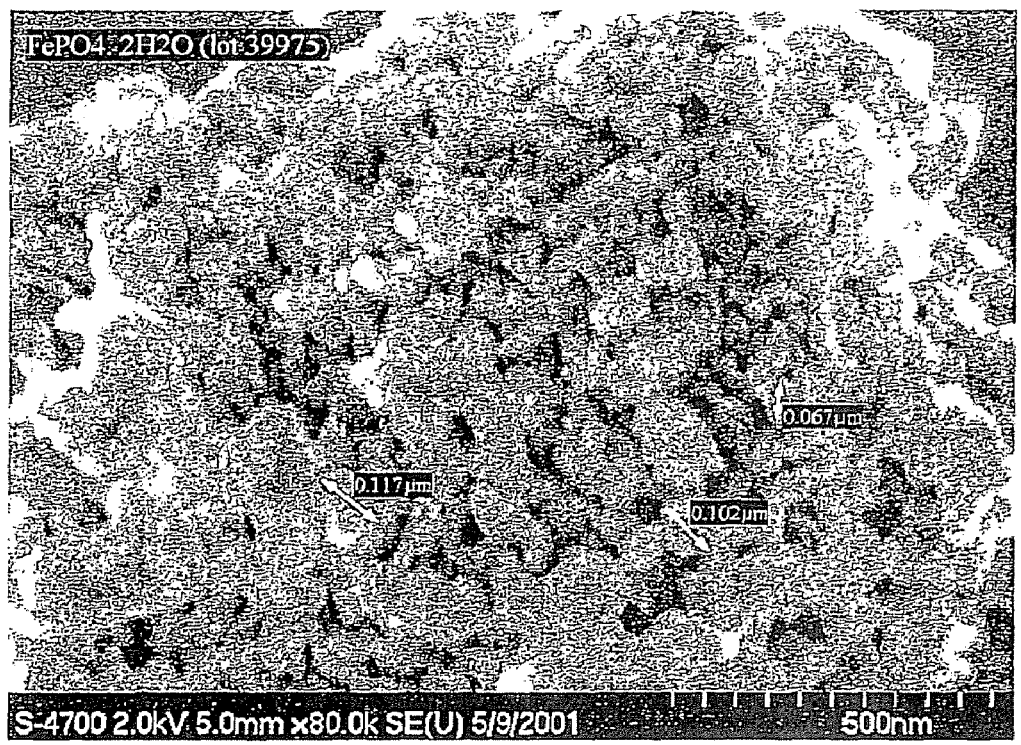
FIG. 7: Scanning electron microscopy—agglomerated nanoparticles of Budenheim FePO$_4$.2H$_2$O (grade E53-81).

LiFePO$_4$ is synthesized by reaction in the solid state between FePO$_4$.2H$_2$O (Budenheim grade E53-81) and Li$_2$CO$_3$ (Limtech 99.9%) in the presence of a carbon additive of the polyethylene-block-poly(ethylene glycol) 50% ethylene oxide type (Aldrich) having a molar mass of 1400 dissolved in water. The particles of ferric phosphate dihydrate (FIG. 7) are between 0.1 μm and 6 μm in diameter. They are made up of agglomerates of nanoparticles on the order of 50 nm to 100 nm. The ferric phosphate is mixed with lithium carbonate and dispersed in water. The fraction of copolymer block added represents 3% w/w of the mass of phosphate and carbonate used. The precursors are dispersed in a ball mill, then dried using a Niro brand spray dryer. 200 g of the mixture are introduced into a Linder brand rotary batch kiln scavenged by 5 lpm of a 1:1 molar mixture of CO/CO$_2$. The 1:1 molar CO/CO$_2$ gaseous phase in equilibrium with the iron (II) insures reduction of the ferric phosphate to triphylite. The temperature rises gradually by 20° C. to 700° C. in 90 minutes, then it is held at 700° C. for 60 minutes. The sample is then cooled from 700° C. to ambient temperature in 30 minutes. The LiFePO$_4$ obtained using agglomerates of nanoparticles of FePO$_4$.2H$_2$O dispersed in the presence of the carbon additive is presented in FIG. 8. The LiFePO$_4$ essentially maintains the form and the initial size of the ferric phosphate particles. The carbon coating produced by pyrolysis of the carbonated additive completely suppresses the sintering and makes it possible to control the morphology of the final product. As in the preceding examples, the carbon coating improves the electronic conductivity of the LiFePO$_4$ containing 1% of carbon determined by elementary analysis.

Example 5

Synthesis of Dense Particles

LiFePO$_4$ is synthesized by reaction in the solid state between FePO$_4$.2H$_2$O (Budenheim grade E53-82) and Li$_2$CO$_3$ (Limtech 99.9%) in the presence of a carbon additive of the polyethylene-block-poly(ethylene glycol) 50% ethylene oxide type (Aldrich) having a molar mass of 1400 dissolved in water. The dense particles of ferric phosphate dihydrate (FIG. 9) of between 0.1 μm and 20 μm are mixed with lithium carbonate and crushed in water. The fraction of block copolymer added represents 3% w/w of the mass of phosphate and carbonate used. The precursors are crushed in a ball mill, then dried using a Niro brand spray dryer. The mixture is introduced into a Linder brand rotary batch kiln scavenged by 5 lpm of a 1:1 molar mixture of CO/CO$_2$. The 1:1 molar CO/CO$_2$ gaseous phase in equilibrium with the iron (II) insures reduction of the ferric phosphate to triphylite. The temperature rises gradually by 20° C. to 700° C. in 90 minutes, then it is held at 700° C. for 60 minutes. The sample is then cooled from 700° C. to ambient temperature in 30 minutes. The LiFePO$_4$ obtained using dense FePO$_4$.2H$_2$O crushed in the presence of carbonated additive is presented in FIG. 10. The elementary analysis indicates that it contains 1.2% C.

Figure 8:
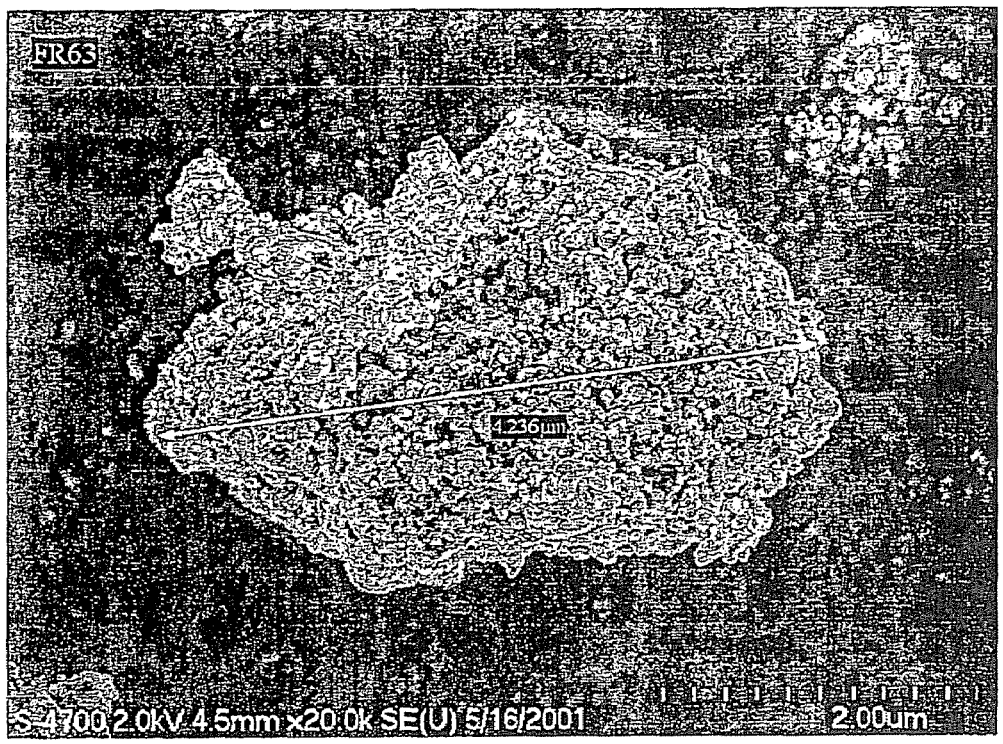
FIG. 8: Scanning electron microscopy showing a particle of the LiFePO type obtained by reaction in solid state between agglomerated nanoparticles of Budenheim FePO$_4$.2H$_2$O (grade E53-81) and Limtech Li$_2$CO$_3$ (99.9%) in the presence of a carbonated polyethylene-type additive.
Figure 9:
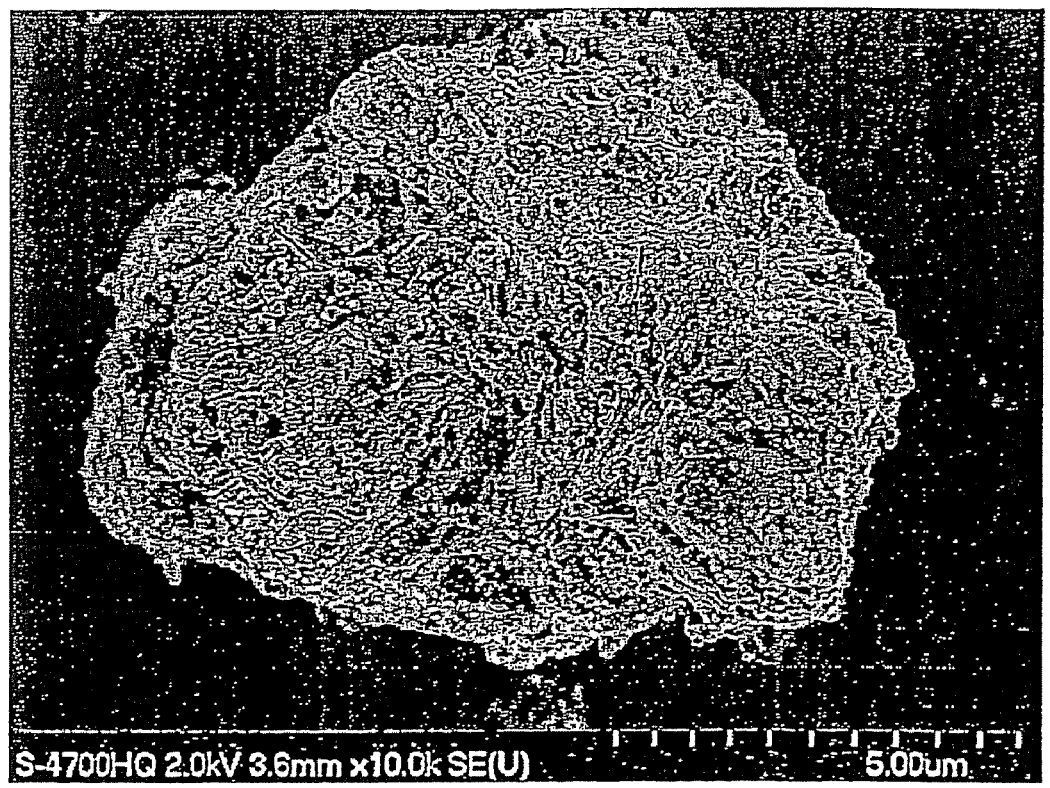
FIG. 9: Scanning electron microscopy of dense particles of ferric phosphate dihydrate, Budenheim grade E53-82.
Figure 10:
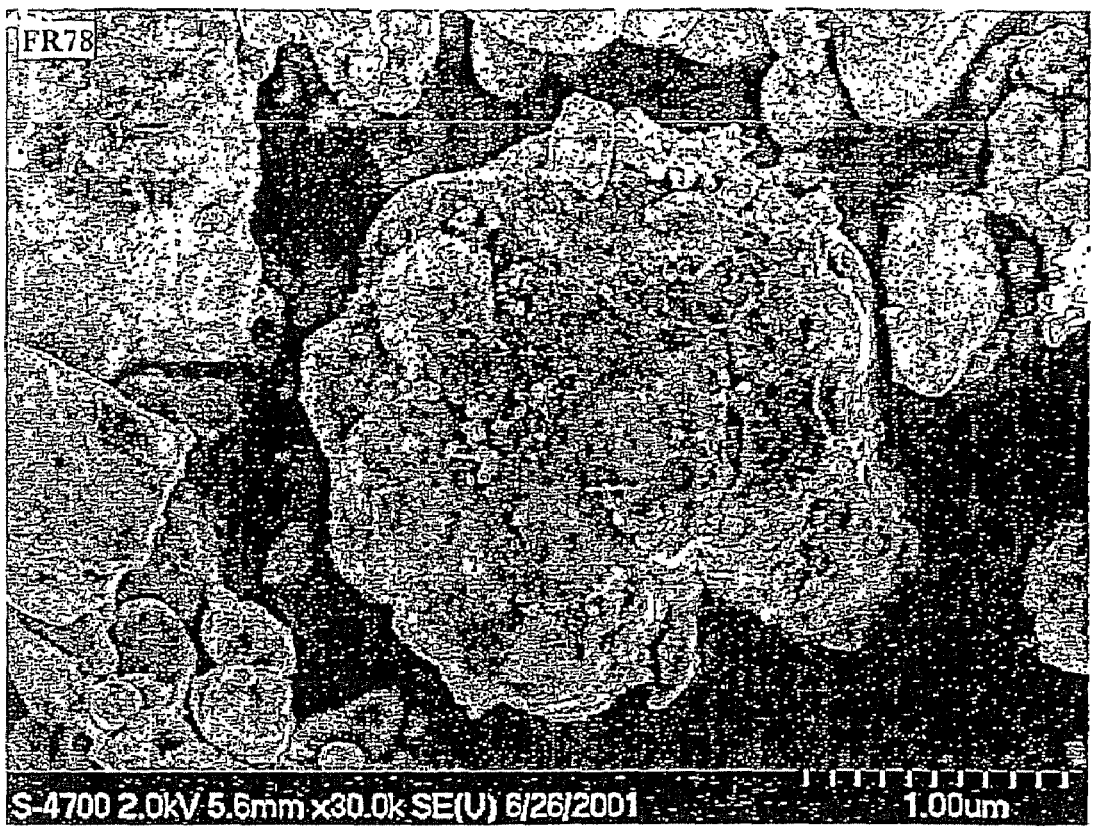
FIG. 10: Triphylite synthesized using dense particles of ferric phosphate, Budenheim grade E53-82, in the presence of a polyethylene-type carbonated additive.

In comparison, the typical morphology of LiFePO$_4$ in FIG. 10 is denser and less porous than the LiFePO$_4$ in FIG. 8 and essentially retains the shape and the size of the particles of the precursor FePO$_4$ 2H$_2$O, illustrated in FIG. 9. The reaction products of examples 4 and 5 have a similar average apparent granulometry mainly made up of particles of 0.1 μm and 6 μm in diameter that differ in their density and are more or less porous depending on the intial precursors. The carbonated additives of the polyethylene type coat the grains of ferric phosphate at the time of drying by spray drying. At the time of thermal processing, the carbonated additive pyrolyzes and coats the particles with a fine layer of carbon. This layer of carbon totally suppresses the sintering, thus preserving the initial shape and size of the ferric phosphate in the precursor mixture after grinding With lithium carbonate. The carbonated additive makes it possible to control the agglomeration of the final LiFePO$_4$ by suppressing sintering at the time of thermal processing. The particles formed using dense ferric phosphate present a greater compactness and make possible the fabrication of dense electrodes ("loading"). Dense electrode is understood here as a large quantity of active material (LiFePO$_4$) per volume unit. As in the preceding examples, the coating of this fine layer of carbon improves the electronic conductivity of the product and increases the electrochemical performance of the composite electrode.

Example 6

Comparison of the Electrochemical Behavior of Materials Prepared in Examples 4 and 5 in Electrochemical Cells The materials prepared in examples 4 and 5 were tested in CR 2032 button cells of lithium polymer batteries at 80° C. The cathodes were prepared by mixing the powder of the active material with carbon black (Ketjenblack®) to insure electronic exchange with the current collector and poly(ethylene oxide) with mass 400,000 used as the binding agent on one hand, and ionic conductor on the other. The proportions by weight are 51:7:42. Acetonitrile is added to the mixture to dissolve the poly(ethylene oxide) in a quantity that is adequate to form a homogeneous suspension. The suspension obtained is then dripped onto a 1 cm$^2$ stainless steel disk. The cathode thus prepared is dried in a vacuum, then transferred in a glove box under helium atmosphere (<1 ppm H$_2$O, O$_2$). A sheet of lithium (27 μm) laminated on a nickel substrate was used as the anode. The polymer electrolyte was made of poly(ethylene oxide) with mass 5,000,000 and a bistrifluorosulfonimide lithium salt Li[(CF$_3$SO$_2$)$_2$N]) (hereinafter referred to as LiTFSI) in oxygen proportions of oxyethylene units/lithium ions of 20:1.

Electrochemical experiments were carried out at 80° C., the temperature at which the ionic conductivity of the electrolyte is adequate (2×10$^{-3}$ Scm$^{-1}$).

Figure 11:
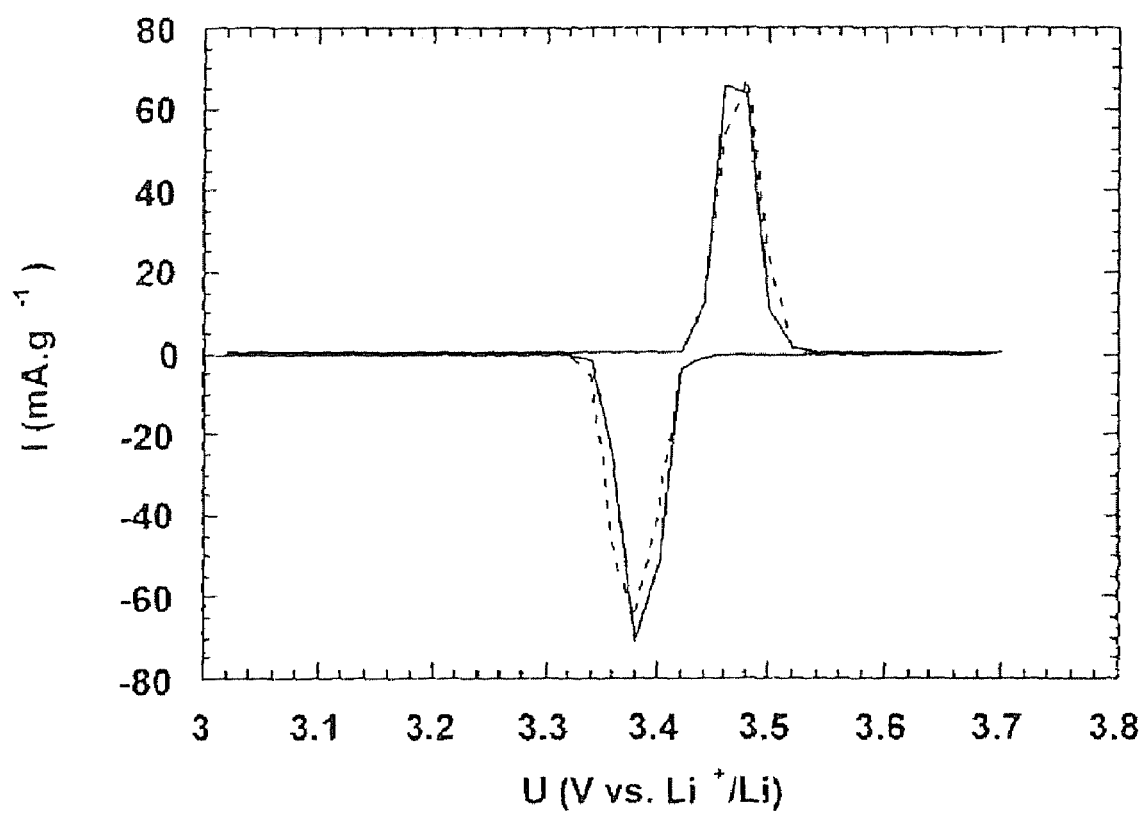
FIG. 11: $5^{th}$ cycle obtained by slow voltametry (80° C., mV·h$^{-1}$) for the sample prepared using iron phosphate from example 4 and using iron phosphate from example 5.
Figure 12:
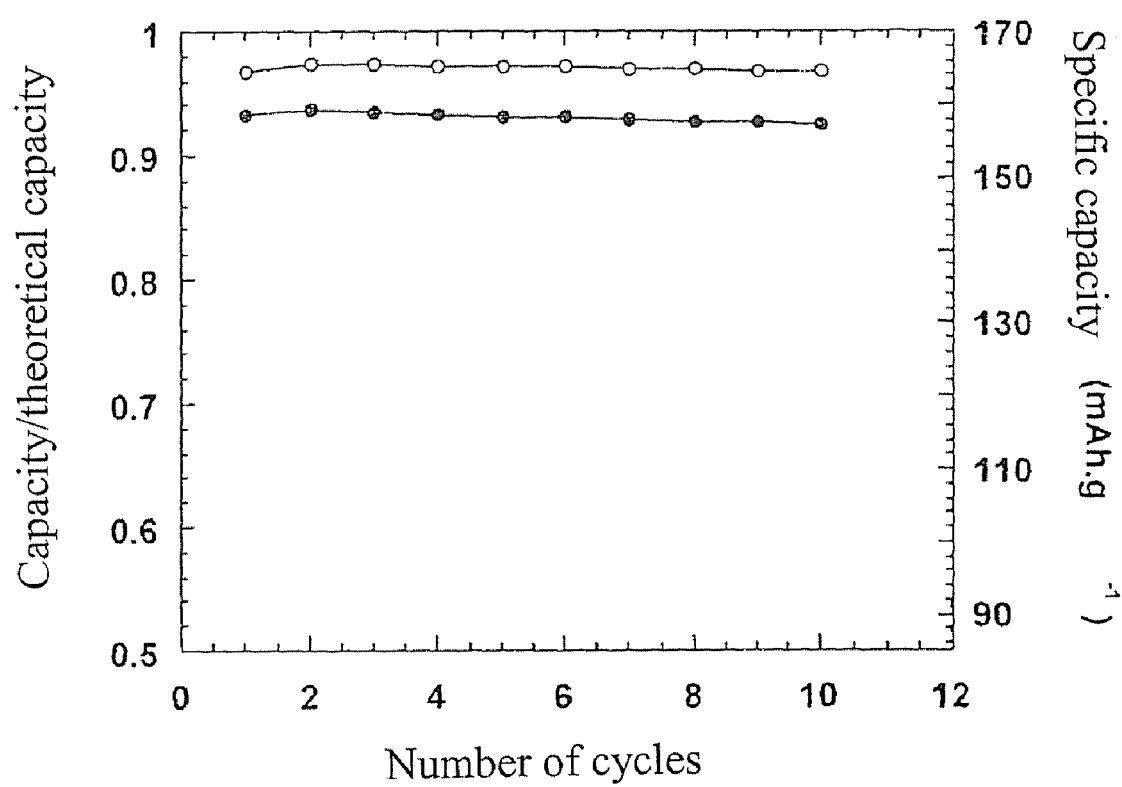
FIG. 12: Trend in capacity obtained during discharging in the course of cycling for the sample prepared using iron phosphate from example 4 and phosphate from example 5 (slow cycling voltametry 20 mV·h$^{-1}$, 80° C.).

FIG. 11 shows the first cycle obtained by slow voltametry, a technique well known to the person skilled in the art (20 mV·h$^{-1}$), controlled by a Macpile® model battery cycler (Biologic™, Claix, France), of the samples prepared in examples 4 and 5 with a current peak around 70 mA/g. The two samples present excellent electrochemical performance in cycling, see FIG. 12.

Example 7

Continuous Production in Electrical Rotary Kiln

The Budenheim (grade E53-81) ferric phosphate dihydrate (FePO$_4$.2H$_2$O) (FIG. 7) is mixed in stoichiometric quantity in water with lithium carbonate (Li$_2$CO$_3$) from Limtech (99.9%) using a ball mill. The ferric phosphate dihydrate is present in the form of fine powder having elementary particles between 0.1 μm and 6 μm in diameter. These elementary particles are formed of agglomerates of nanoparticles. Polyethylene-block-poly(ethylene glycol) copolymer as described in example 4 is added as carbon additive that improves the conductivity of the final product by pyrolysis at the time of thermal processing of the precursor mixture. The mass of block copolymer equals 3% w/w of the quantity of ferric phosphate and lithium carbonate. The following reagent quantities are used:

| | |
|---|---|
| FePO$_4$.2H$_2$O (Budenheim grade E53-81) = | 40 kg |
| Li$_2$CO$_3$ (Limtech 99.9%) = | 7.91 kg |
| Copolymer PE/PEO = | 1.44 kg |
| Demineralized water = | 40 liters |

The mixture is dried using a Niro brand spray dryer, then fed to an ABB-Raymond rotary kiln. The rotary kiln is 16.5 cm in diameter and 3 m long. The mixture of precursors is fed at 1.4 kg/h in order to obtain a production of around 1 kg/h of LiFePO$_4$ during a period of 34 hours. The precursor feed is adjusted so that the fill percentage of the kiln does not exceed 8% of the internal volume of the kiln, thus insuring uniformity of the stirring and the exchange with the gaseous phase at the time of thermal processing. A gaseous mixture in equilibrium with the iron (II) is introduced into the kiln counter-current to the precursor mixture. The reduction of iron (III) to iron (II) is carried out by CO/CO$_2$ diluted in nitrogen in the following proportions:

3 lpm of CO
2.4 lpm of CO$_2$
15 lpm of N$_2$

The rotary kiln turns at 2 rpm with an angle of 1°. The mixture enters the cold zone at 200° C. then rises to 700° C. in 80 minutes (6.3° C./minute) The calcined product remains at 700° C. for 40 minutes then cools from 700° C. to ambient temperature in 40 minutes. The recovered product contains 0.9% of carbon produced by pyrolysis of the polyethylene-based polymer. An X-ray analysis confirms that the product is triphylite. The elementary particles from 0.1 μm to 6 μm have an average diameter (d$_{50}$) of around 2 μm. They are formed of agglomerates of nanoparticles of several dozen nanometers, similar to the initial product. The partially sintered nanoparticles promote good current density due to their large specific surface area. In addition, the carbon coating promotes an elevated electronic conductivity, an essential criterion in the fabrication of an electrode having an elevated current density and an output close to the theoretical output of LiFePO$_4$, i.e. 170 mAh/g.

Figure 13:
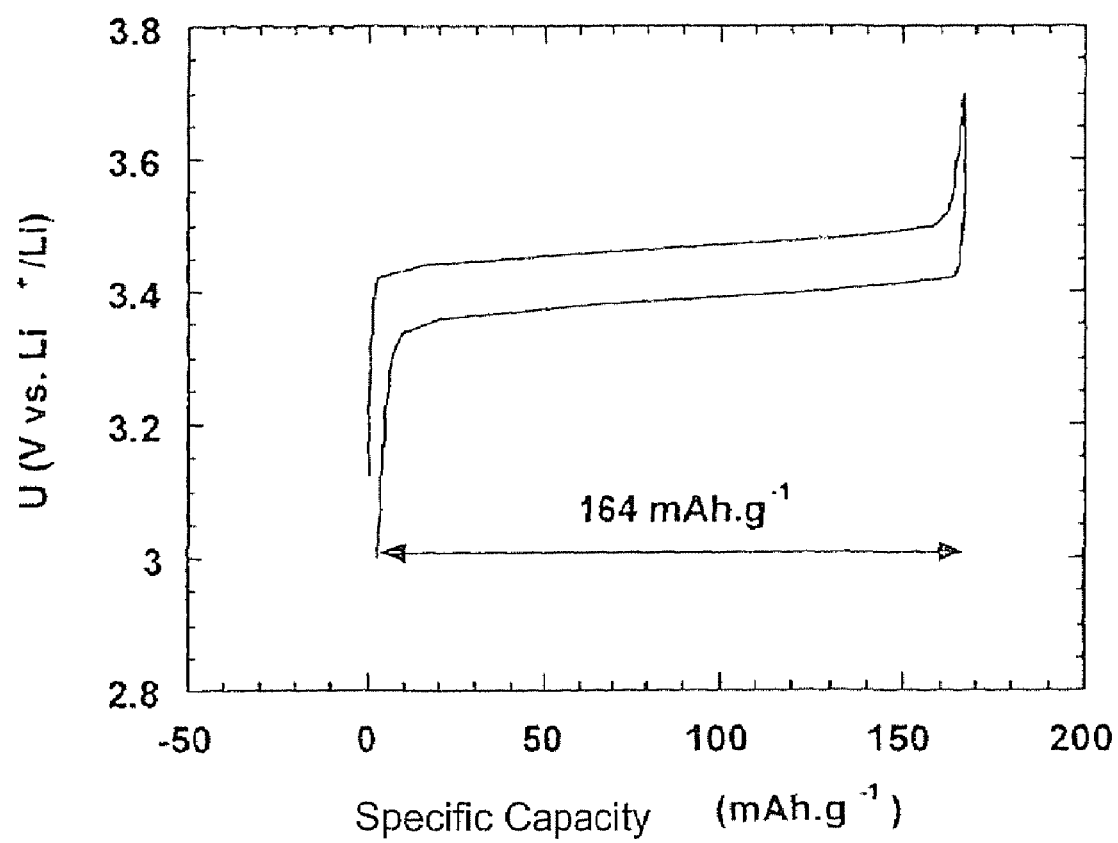
FIG. 13: Charging and discharging profiles obtained by slow voltametry (20 mV·h$^{-1}$, 80°[C]) of a LiFePO$_4$ sample produced on the pilot scale using 6 μm FePO$_4$2H$_2$O (reduction by 1:1 CO/CO$_2$) according to example 7.

The material prepared was tested in CR 2032 button cells described in example 6 and exhibit an output of 96% (164 mAh/g) illustrated in FIG. 13.

Example 8

Reducing Gas from Partial Combustion of Natural Gas

LiFePO$_4$ is synthesized by reaction in the solid state between Budenheim FePO$_4$.2H$_2$O (grade E53-81) and Li$_2$CO$_3$ from Limtech (99.9%) in the presence of a carbon additive of the polyethylene-block-poly(ethylene glycol) 50% ethylene oxide type (Aldrich) having a molar mass of 1400 dissolved in water. Particles of ferric phosphate dihydrate of between 0.1 μm and 6 μm are mixed with lithium carbonate and crushed in water. The fraction of copolymer added represents 4% w/w of the mass of phosphate and carbonate used. The precursors are dispersed in a ball mill. then dried using a Niro brand spray dryer. The mixture is introduced into a Linder brand rotary batch kiln. A reducing mixture of partially burned natural gas in the presence of air in an external reformer. It is then introduced into the kilti at a rate of 5 lpm. The gaseous mixture is generated independently by mixing natural gas (methane) and air in a 1:5 ratio. The analysis of the gaseous mixture shows the following concentrations: 14% H$_2$, 14% H$_2$O, 11% CO. 3% CO$_2$ and 58% N$_2$. The temperature rises gradually from 20° C. to 700° C. in 90 minutes (7.6° C./minute), then it is held at 700° C. for 60 minutes. The sample is then cooled from 700° C. to ambient temperature in 30 minutes. The product obtained is similar to the one in FIG. 8. An X-ray analysis shows the olivine structure of the triphylite. The elementary analysis indicates that the sample contains 1.5% carbon.

Figure 14:
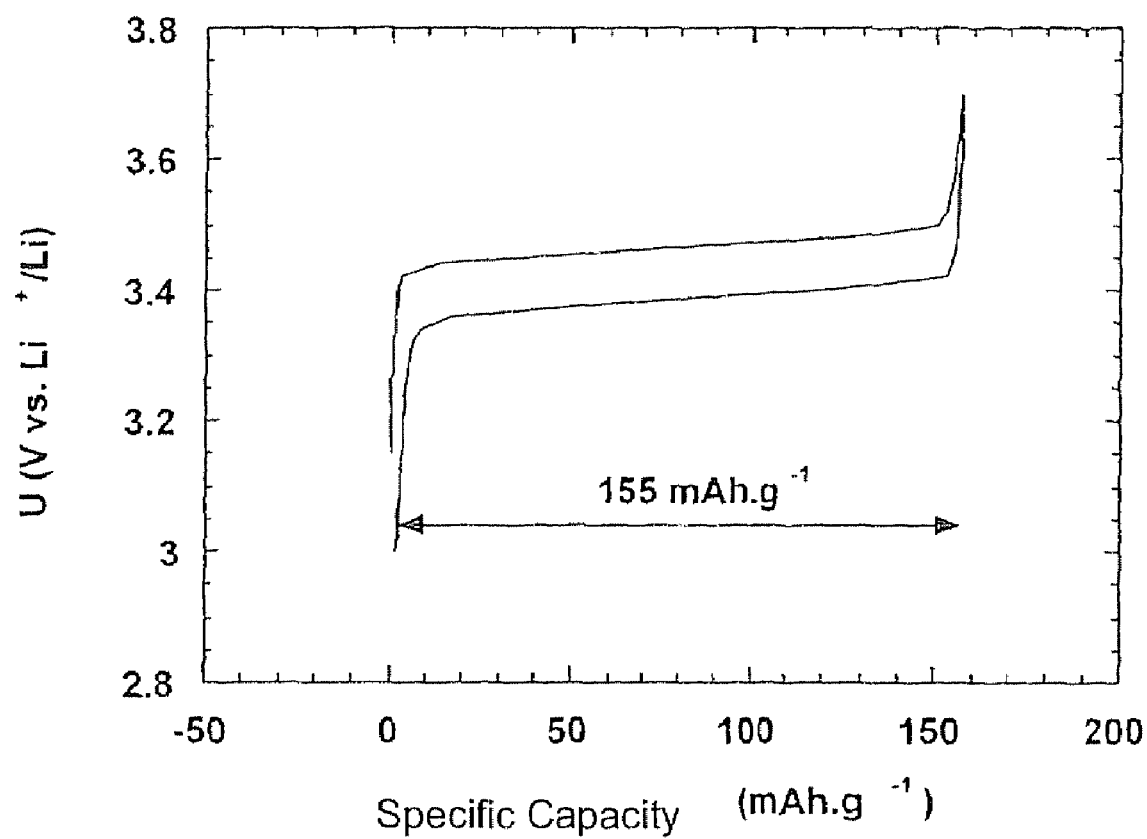
FIG. 14: Charging and discharging profiles obtained by slow voltametry (20 mV·h$^{-1}$, 80° C.) of a LiFePO$_4$ sample prepared using FePO$_4$2H$_2$O according to example 8.

The material prepared was tested in CR 2032 button cells described in example 6. It exhibits an output of about 92% (155 mAh/g)., see FIG. 14.

Example 9

Reducing Gas from Partial Combustion of Propane

LiFePO$_4$ is synthesized by reaction in solid state between Budenheim ferric phosphate dihydrate (grade E53-81) and lithium carbonate (Limtech 99.9%). The two precursors are mixed in stoichiometric quantities then dispersed in water using a ball mill. A carbonated additive of the polyethylene-block-poly(ethylene glycol) type that is soluble in water is added to the mixture at the time of grinding. The fraction of copolymer added represents 4% w/w of the mass of phosphate and carbonate used. This additive will carbonize at the time when the mixture is processed thermally and will deposit a thin layer of carbon on the surface of the particles.

For this example, the following reagent quantities are used:

FePO$_4$.2H$_2$O (Budenheim E53-81)=100 kg
Li$_2$CO$_3$ (Limtech 99.9%)=19.78 kg
Copolymer PE/PEO=4.79 kg
Demineralized water=100 liters The mixture, dispersed very homogeneously using a horizontal ball mill containing steel balls 2 mm in diameter, is dried using a Niro brand spray dryer. It is then fed into a Bartlett & Snow direct fired rotary kiln. The kiln has an interior diameter of 38.1 cm and an interior length of 4 m 80 [cm]. The precursor mixture is fed in counter-current to the gas in the kiln that is rotating at 3 rpm with an angle of 1°. The atmosphere in equilibrium with the iron (II) is generated in situ by partial combustion of the propane fed into the 500,000 BTU burner. For each mol of propane gas injected into the kiln, 13 moles of air (equivalent to 2.75 mols oxygen) are injected in order to partially burn the gas and generate a reducing atmosphere that makes it possible to reduce the ferric phosphate to triphylite. The chemical composition of the gaseous phase generated in situ is 13.6% CO, 3.2% CO$_2$, 12% H$_2$, 11.2% H$_2$O and 60% N$_2$.

The mixture is fed at 5 kg/h for 25 hours. It enters the kiln at around 200° C., then gradually rises to about 700° C. at 5° C./minute in order to promote complete reaction of the precursors. The product remains at around 700° C. for about 15 minutes. The LiFePO$_4$ is present in the form of a fine black non-agglomerated powder containing 1.5% of carbon produced by pyrolysis of the polyethylene-type carbon additive. The carbon fraction is obtained by elementary analysis.

Figure 15:
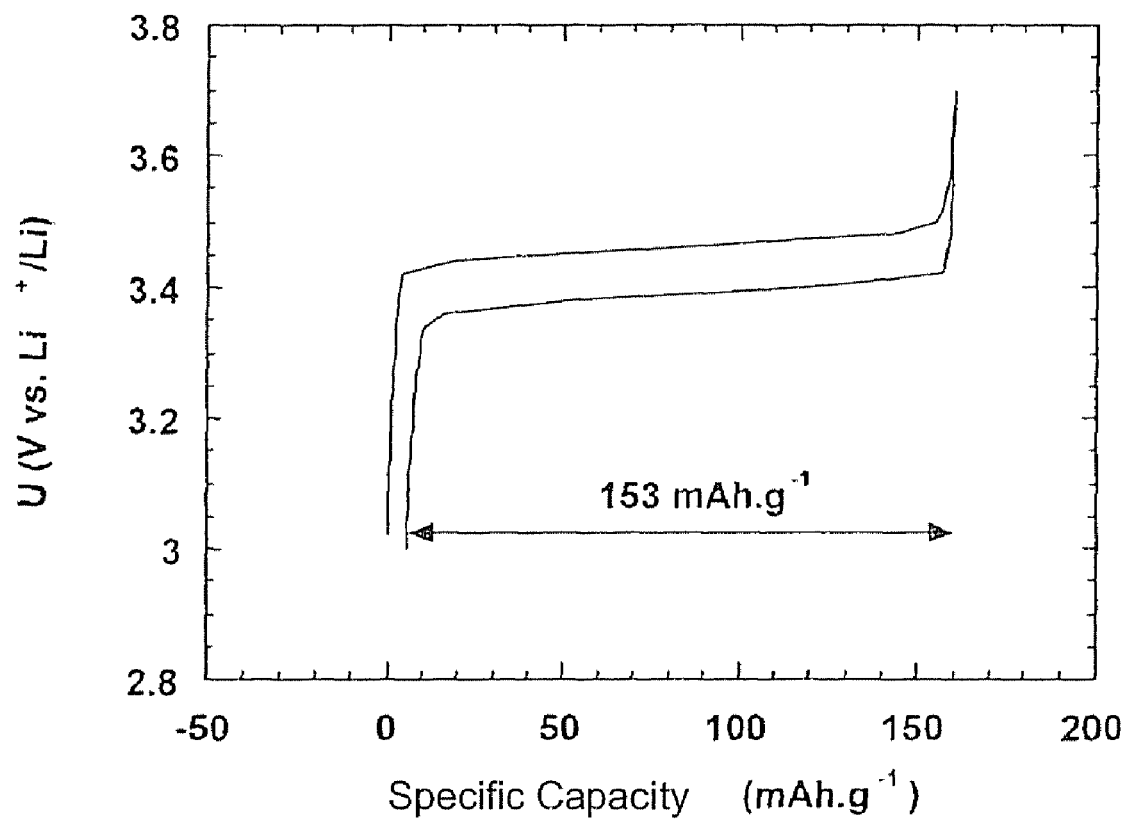
FIG. 15: Charging and discharging profiles obtained using slow voltametry (20 mV·h$^{-1}$, 80° C.) of a LiFePO$_4$ sample prepared using FePO$_4$2H$_2$O according to example 9.

The material prepared in example 9 was tested in CR 2032 button cells described in example 6. FIG. 15 shows that the material has an output of 90% with an current peak around 75 mAh/g.

Example 10

Preparation of $LiFe_{0.5}Mn_{0.5}PO_4$ in Reducing Atmosphere $LiFe_{0.5}Mn_{0.5}PO_4$ was prepared by mixing stoichiometric quantities of $LiH_2PO_4$, $FeC_2O_4 \cdot 2H_2O$ and $(CH_3COO)_2Mn \cdot 4H_2O$. These compounds are ground in heptane. After drying, the mixture is heated progressively to 400° C. in air to decompose the acetate and oxalate groups. This temperature is maintained for 8 hours. In the course of this processing, iron (II) oxidizes to iron (III). The mixture is then ground again in an acetone solution containing the carbon precursor (cellulose acetate 39.7% by weight of the acetyl groups, 5% by weight with respect to the mixture). After drying, the mixture is processed thermally with 1:1 $CO/CO_2$ scavenging according to the protocol described in example 3.

The final compound contains 0.8% carbon. Its electronic conductivity is $5 \cdot 10^{-4}$ S·cm$^{-1}$, measured according to the technique described in example 1. The electrochemical behavior of the $LiFe_{0.5}Mn_{0.5}PO_4$ sample was evaluated at ambient temperature in a lithium battery containing a liquid electrolyte.

The cathodes are made up of a mixture of active material, of carbon black and of a bonding agent (PVDF in solution in N-methylpyrrolidone) in a ratio of 85:5:10. The composite is spread on an aluminum current collector. After drying, the electrodes of 1.3 cm$^2$ and with a capacity of around 1.6 mAh are cut with a hollow punch. The batteries are assembled in a glove box with inert atmosphere.

The measurements were carried out in an electrolyte containing 1M $LiClO_4$ in a 1:1 EC: DMC mixture. The anode is made of lithium. The tests are carried out at ambient temperature.

Figure 16:
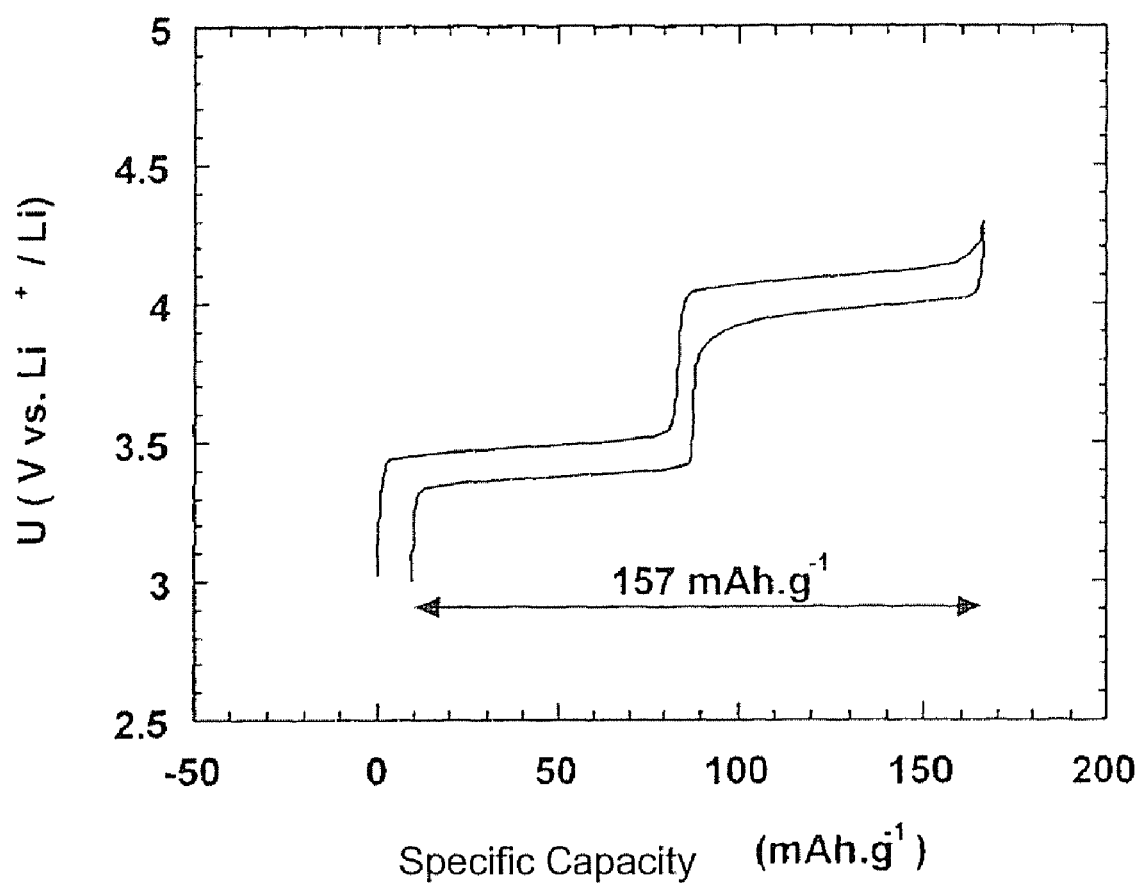
FIG. 16: Charging and discharging curves of a battery cycled in galvanostatic mode between 3 and 4.3 volts according to example 10.

FIG. 16 presents the charging and discharging cur-es of a battery cycled in galvanostatic mode between 3 and 4.3 volts. The charging and discharging loads applied correspond to C/24 (the battery is charged 24 hours, then discharged for the same amount of time).

The discharging curve has two plateaus: the first, around 4 V, corresponds to the reduction of manganese (III) to manganese (II) and the second, around 3.4, corresponds to the reduction of iron (III) to iron (II). The specific capacity obtained during discharge is 157 mAh·g$^{-1}$, which corresponds to 92% of the theoretical capacity.

Example: 11—

The compound $C-Li_xM_{1-y}M'_y(XO_4)_n$ is produced by using an iron powder with a size of several microns. $LiH_2PO_4$ and the carbon conductor additive (copolymer) such as is used in the previous examples.

These reagents are intimately mixed by grinding them together in an atmosphere made up of a 1:1 mixture of $CO/CO_2$.

The presence of the compound $LiFePO_4$ is confirmed by the X-ray diffraction diagram obtained from the powder thus obtained.

Example 12

Control of the Morphology by Spray Drying $LiFePO_4$ is synthesized by reaction in solid state between $FePO_4 \cdot 2H_2O$ (Budenheim grade E53-81) and $Li_2CO_3$ (Limtech 99.9%) in the presence of a carbon additive derived from cellulose. The particles of ferric phosphate dihydrate are between 0.1 μm and 6 μm in diameter. The ferric phosphate is mixed with lithium carbonate and dispersed in water. A carbon additive of the hydroxyethyl cellulose type (Aldrich) is dissolved in water. The fraction of cellulose added represents 6% w/w of the mass of phosphate and carbonate used. The precursors are dispersed in a ball mill, then dried using a Buchi brand laboratory spray dryer equipped with a pressure nozzle. The mixture is introduced into a Linder brand rotary batch kiln scavenged by a 1:1 molar mixture of $CO/CO_2$. The 1:1 molar $CO/CO_2$ gaseous phase in equilibrium with the iron (II) insures reduction of the ferric phosphate to triphylite. The temperature rises gradually from 20° C. to 700° C. in 90 minutes, then it is held at 700° C. for 60 minutes. The sample is then cooled from 700° C. to ambient temperature in 30 minutes. The $LiFePO_4$ obtained using $FePO_4 \cdot 2H_2O$ and $Li_2CO_3$, dispersed and dried by spray drying in the presence of carbonated additive derived from cellulose, is shown in FIG. 17. It can be confirmed that the drying by spray drying of the mixture of precursors makes it possible to control the size and the morphology of the final product. It makes it possible to produce spherical agglomerates of the desired size. It is knows that it is possible to adjust the size of the agglomerates by varying the spray drying parameters such as the type of nozzle (pressure nozzle, rotary or two-fluid), the percentage of solid in the mixture, the viscosity and temperature of injection, etc. The carbon coating improves the electronic conductivity of this sample of $LiFePO_4$ containing 1.09% of carbon determined by elementary analysis and having a conductivity of $2 \cdot 10^{-3}$ S·cm$^{-1}$ measured according to the technique described in example 1.

The material prepared was tested in a CR 2032 button cell described in the preceding examples. It has a capacity equivalent to 92% of the theoretical capacity, i.e. 156 mAh/g.

Example 13

Coating and Cross-Linking of the $LiFePO_4$ Particles with carbon $LiFePO_4$ is synthesized by reaction in solid state between $FePO_4 \cdot 2H_2O$ (Budenheim grade E53-81) and $Li_2CO_3$ (Limtech 99.9%) in the presence of a mixture of carbonated additives. The particles of ferric phosphate dihydrate are between 0.1 μm and 6 μm in diameter. The ferric phosphate is mixed with lithium carbonate and dispersed in water. The carbon additive mixture contains polyethylene-block-poly (ethylene glycol) as described in the previous examples, dissolved in isopropanol and cellulose acetate. The fraction of polyethylene-block-poly(ethylene glycol) added represents 1% w/w of the mass of phosphate and carbonate, while the cellulose acetate fraction represents 4% of the mass of phosphate and carbonate. The precursors are crushed in a ball mill, then dried. The mixture is introduced into a Linder brand rotary batch kiln scavenged by a mixture of 5 lpm 1:1 molar mixture of $CO/CO_2$. The 1:1 molar $CO/CO_2$ gaseous phase in equilibrium with the iron (II) insures reduction of the ferric phosphate to triphylite. The temperature rises gradually from 20° C. to 700° C. in 90 minutes, then it is held at 700° C. for 60 minutes. The sample is then cooled from 700° C. to ambient temperature in 30 minutes.

The $LiFePO_4$ observed by transmission electron microscopy is presented in FIG. 18. This figure shows particles that are not sintered, but coated and cross-linked by the carbon, confirming by all evidence the close physical bond between the carbon and the $LiFePO_4$. This cross-linking makes it possible to produce agglomerates of $LiFePO_4$ bonded by carbon. The carbon coating and cross-linking improves the electronic conductivity of composite cathodes manufactured using this sample of LiFePO$_4$ containing 1.12% of carbon determined by elementary analysis and having an excellent conductivity of 3.10$^{-3}$ S·cm$^{-1}$ measured according to the technique described in example 1.

The material prepared was tested in a CR 2032 button cell described in the preceding examples. It has a capacity equivalent to 97% of the theoretical capacity (164 mAh/g) with an excellent current density.

The invention claimed is:

1. A method for the synthesis of compounds of the formula C—Li$_x$M$_{1-y}$M'$_y$(XO$_4$)$_n$, wherein C represents carbon cross-linked with the compound of formula Li$_x$M$_{1-y}$M'$_y$(XO$_4$)$_n$, wherein $0 \leq x \leq 2$, $\leq y \leq 0.6$, and $1 \leq n \leq 1.5$, M is at least one transition metal selected from the first line of the periodic table, M' is an element with a fixed valency selected from the group consisting of Mg$^{2+}$, Ca$^{2+}$, Al$^{3+}$, Zn$^{2+}$ and combinations thereof and X is S, P or Si, said method comprising:

bringing into equilibrium in the required proportions, for a duration of less than 5 hours, a mixture comprising the following precursors:
a) a source of M comprising at least one transition metal or at least one salt thereof;
b) a source of the element M' that is a salt of M';
c) a source of lithium that is a salt of lithium;
d) a compound that is a source of X; and
e) a source of a carbon conductor that is an organic substance,
wherein the source of M and the source of M', if any, is in the form of precursor particles having a size of between 0.1 micrometer to 6 micrometer, wherein the precursor particles are made up of agglomerates of nanoparticles on the order of 50 nm to 100 nm,
wherein the sources of the elements M, M', Li and X are introduced, in whole or in part, in at least one step, in the form of compounds having more than one source element,
wherein the precursors a) to d) are mixed intimately, and
wherein a synthesis reaction is carried out by thermodynamic or kinetic reaction and bringing into equilibrium, in the required proportions, the mixture of the precursors a) to d), with a gaseous reducing atmosphere to provide an oxidation state of the transition metal of the desired valency for the formation of Li$_x$M$_{1-y}$M'$_y$(XO$_4$)$_n$, by controlling the composition of said gaseous atmosphere, the temperature of the synthesis reaction step, and the amount of precursor c) relative to the amount of precursors a), b) and d);

the method further comprising at least one pyrolysis step of the source compound e) so as to obtain a carbon conductor with an electronic conductivity greater than 10$^{-8}$ S·cm$^{-1}$, when measured on a sample of powder compressed at a pressure greater than or equal to 3000 Kg·cm$^{-2}$, wherein the synthesis reaction between the precursors a) to d) is carried out simultaneously with the pyrolysis reaction of the precursor e).

2. The method for the synthesis according to claim 1, wherein the synthesis is conducted such that the oxidation state of the transition metal is equal to two for iron, manganese, cobalt and nickel, and three or four for titanium and vanadium.

3. The method for the synthesis according to claim 1, in which compounds of the formula C—Li$_x$M$_{1-y}$M'$_y$(XO$_4$)$_n$ are obtained in the form of particles or agglomerates of particles in which the size and/or the shape of the particles or the agglomerates is essentially determined by the size and the shape of a mixture of the precursors a) to d) used for the synthesis reaction.

4. The method for the synthesis according to claim 3, in which the particles are in the form of agglomerates of particles of C—LiFePO$_4$ and the size and/or the shape of particles is essentially determined by the size and/or the shape of the Fe source.

5. The method for the synthesis according to claim 3, in which the agglomerates of particles have a size between 0.05 and 10 micrometers.

6. The method for the synthesis according to claim 3, in which the size of the particles is between 0.1 and 10 micrometers.

7. The method for the synthesis according to claim 3, in which the size of the particles is between 0.05 and 0.10 micrometers.

8. The method for the synthesis according to claim 5, in which the size and the shape of the particles of the compound C—Li$_x$M$_{1-y}$M'$_y$XO$_4$)$_n$ do not differ by more than 80% from that of the size of precursors a) to d).

9. The method for the synthesis according to claim 6, in which the size and the shape of the particles of the compound C—Li$_x$M$_{1-y}$M'$_y$XO$_4$)$_n$ do not differ by more than 80% from that of the size of precursors a) to d).

10. The method for the synthesis according to claim 7, in which the size and the shape of the particles of the compound C—Li$_x$M$_{1-y}$M'$_y$XO$_4$)$_n$ do not differ by more than 80% from that of the size of precursors a) to d).

11. The method for the synthesis according to claim 8, in which the size and the shape of the particles of compound C—Li$_x$M$_{1-y}$M'$_y$XO$_4$)$_n$ satisfy at least one of the following conditions:
do not differ by more than 80% from that of precursor a); and
do not differ by more than 80% from that of precursor b).

12. The method for the synthesis according to claim 1, in which the amount of the source of carbon conductor is sufficient to coat at least a part of the surface of particles of the compound of formula Li$_x$M$_{1-y}$M'$_y$(XO$_4$)$_n$ with carbon.

13. The method for the synthesis according to claim 12, in which the amount of bound carbon is less than 5% of the mass of the compounds of formula Li$_x$M$_{1-y}$M'$_y$(XO$_4$)$_n$.

14. The method for the synthesis according to claim 13, in which the amount of bound carbon is less than 3%, of the mass of the compounds of formula Li$_x$M$_{1-y}$M'$_y$(XO$_4$)$_n$.

15. The method for the synthesis according to claim 12, in which at least 30% of the surface of the particles of the compound of formula Li$_x$M$_{1-y}$M'$_y$(XO$_4$)$_n$ is covered with carbon.

16. The method for the synthesis according to claim 13, in which at least 30% of the surface of the particles of the compound of formula Li$_x$M$_{1-y}$M'$_y$(XO$_4$)$_n$ is covered with carbon.

17. The method for the synthesis according to claim 1, in which the amount of the source of carbon conductor is sufficient to bond particles of compound Li$_x$M$_{1-y}$M'$_y$(XO$_4$)$_n$ with each other and to constitute carbon bounded agglomerates with sizes comprised between 1 and 20 microns.

18. The method for the synthesis according to claim 17, in which the weight of bound carbon is less than 7% of the total weight of the compound of formula Li$_x$M$_{1-y}$M'$_y$(XO$_4$)$_n$.

19. The method for the synthesis according to claim 17, in which the weight of bound carbon is less than 3% of the total weight of the compound of formula Li$_x$M$_{1-y}$M'$_y$(XO$_4$)$_n$.

20. The method for the synthesis according to claim 1, in which a final form of the compound of formula C—Li$_x$M$_{1-y}$ $M'_y(XO_4)_n$ is determined by a form given to the mixture of precursors a) to d) before synthesis.

21. The method for the synthesis according to claim 20, in which a technique used to give the final form to the mixture of precursors a) to d) is selected from the group consisting of spray-drying, precipitation, coprecipitation, agglomeration and pelletization.

22. The method for the synthesis according to claim 17, in which the mixture of precursors a) to d) is spray-dried and a final form of the compound of formula $C—Li_xM_{1-y}M'_y(XO_4)_n$ comprises spherical agglomerates with sizes between 1 and 30 micrometers, wherein the agglomerates comprise smaller particles of the compound of formula $C—Li_xM_{1-y}M'_y(XO_4)_n$.

23. The method for the synthesis according to claim 21, in which the technique used to give the final form to the mixture of precursors a) to d) is spray-drying, and the final form of the compound of formula $C—Li_xM_{1-y}M'_y(XO_4)_n$ comprises spherical agglomerates with sizes between 1 and 30 micrometers, wherein the agglomerates comprise smaller particles of the compound of formula $C—Li_xM_{1-y}M'_y(XO_4)_n$.

24. The method for the synthesis according to claim 1, in which the compounds of formula $Li_xM_{1-y}M'_y(XO_4)_n$ have an olivine or Nasicon structure.

25. The method for the synthesis according to claim 1, in which the source of carbon conductor is an organic substance selected from the group consisting of polymers and oligomers containing a carbon skeleton, simple carbohydrates or polymers, and aromatic hydrocarbons.

26. The method for the synthesis according to claim 1, in which the source of carbon conductor comprises, in the same compound or in the mixture that constitutes the source of carbon conductor, oxygen and hydrogen that are bound chemically and from which pyrolysis locally releases carbon monoxide, carbon dioxide, hydrogen and water vapor to create locally a reducing atmosphere for synthesis of the material $Li_xM_{1-y}M'_y(XO_4)_n$.

27. The method for the synthesis according to claim 1, in which the source of carbon conductor comprises a block copolymer having at least one carbon source segment that can be pyrolyzed and a segment that is soluble in water and organic solvents to allow distribution throughout the compound $Li_xM_{1-y}M'_y(XO_4)_n$ or precursors a) to d).

28. The method for the synthesis according to claim 27, in which distribution throughout the compound $Li_xM_{1-y}M'_y(XO_4)_n$, or its precursors is homogenous.

29. The method for the synthesis according to claim 25, in which the source of carbon conductor comprises at least one compound of the group consisting of polyethylene, polypropylene, glucose, fructose, sucrose, xylose, sorbose, starch, cellulose and its esters, block polymers of ethylene and ethylene oxide, and polymers of furfuryl alcohol.

30. The method for the synthesis according to claim 26, in which the source of carbon conductor comprises at least one compound of the group consisting of polyethylene, polypropylene, glucose, fructose, sucrose, xylose, sorbose, starch, cellulose and its esters, block polymers of ethylene and ethylene oxide, and polymers of furfuryl alcohol.

31. The method for the synthesis according to claim 27, in which the source of carbon conductor comprises at least one compound of the group consisting of polyethylene, polypropylene, glucose, fructose, sucrose, xylose, sorbose, starch, cellulose and its esters, block polymers of ethylene and ethylene oxide, and polymers of furfuryl alcohol.

32. The method for the synthesis according to claim 1, in which the precursors a) to d) are in the form of a powder or at least partially compressed in the form of pastilles, prior to the synthesis in order to increase the points of contact between the reagents and to increase the density of the final product while allowing reaction with the gaseous atmosphere.

33. The method for the synthesis according to claim 32, in which the synthesis is carried out in a continuous mode.

34. The method for the synthesis according to claim 1, in which the precursor e) is a carbon conductor source compound present at the time of a compacting step for the precursors a) to d).

35. The method for the synthesis according to claim 1, in which the method is carried out continuously.

36. The method for the synthesis according to claim 35, in which the method is carried out in a reactor that promotes the equilibrium of solid powders, with the gaseous atmosphere.

37. The method for the synthesis according to claim 36, in which the reactor is selected from the group consisting of reactors, rotary kilns, fluidized beds, and belt-driven kilns, that allow control of the composition and circulation of the gaseous atmosphere.

38. The method for the synthesis according to claim 37, in which a solid feed is greater than 1 kg/h.

39. The method for the synthesis according to claim 35, in which the synthesis is conducted at temperatures between 650 and 800° C.

40. The method for the synthesis according to claim 35, in which a dwell time is less than 5 hours.

41. The method for the synthesis according to claim 40, in which a dwell time is less than ½ hour.

42. The method for the synthesis according to claim 1, in which a reduction is obtained by controlling the composition of the gaseous atmosphere to reduce the oxidation state of M to the level required for the composition of the compound without reduction to the neutral metallic state.

43. The method for the synthesis according to claim 42, in which a reducing atmosphere is provided which contains hydrogen or a gas that is capable of generating hydrogen under the synthesis conditions, or ammonia or a substance capable of generating ammonia under the synthesis conditions, or carbon monoxide, these gases being used in their pure state or in mixtures, optionally in the presence of water vapor and/or in the presence of carbon dioxide and/or in the presence of a neutral gas.

44. The method for the synthesis according to claim 43, in which the neutral gas is nitrogen or argon.

45. The method for the synthesis according to claim 42, in which a reducing atmosphere is provided composed of a mixture of $CO/CO_2$ or $H_2/H_2O$, or $NH_3/H_2O$ or a mixture thereof, thereby generating an oxygen partial pressure at equilibrium of less than or equal to that determined by the transition metal at the state of oxidation corresponding to the precursors introduced to form the compound $Li_xM_{1-y}M'_y(XO_4)_n$ but higher than the oxygen partial pressure at equilibrium corresponding to the reduction of M or M' in the metallic state, and ensuring thermodynamic stability of $Li_xM_{1-y}M'_y(XO_4)_n$ in the reaction mixture, independently of the synthesis reaction time.

46. The method for the synthesis according to claim 42, in which the atmosphere is composed of a mixture of $CO/CO_2$ or $H_2/H_2O$, or $NH_3/H_2O$ or a mixture thereof, thereby generating an oxygen partial pressure at equilibrium greater than or equal to that determined by at least the transition elements, when the precursor a) is introduced in the metallic form, to form the compound $Li_xM_{1-y}M'_y(XO_4)_n$ but greater than that corresponding to a superoxidation of the transition elements beyond their assigned valence in $Li_xM_{1-y}M'_y(XO_4)_n$ insuring thermodynamic stability of $Li_xM_{1-y}M'_y(XO_4)_n$ in the reaction mixture, independently of the synthesis reaction time.

47. The method for the synthesis according to claim 42, in which the reducing atmosphere is made up of a mixture of $CO/CO_2$ or $H_2/H_2O$, or $NH_3/H_2O$ or a mixture thereof, thereby generating an oxygen partial pressure at equilibrium less than or equal to that determined by one of the transition metals present in $Li_xM_{1-y}M'_y(XO_4)_n$.

48. The method for the synthesis according to claim 47, wherein the reduction of the transition element, present in $Li_xM_{1-y}M'_y(XO_4)_n$, to the metallic state is obtained by controlling the temperature and the contact time with the gaseous atmosphere or the proportion of the precursor c) in the reaction mixture.

49. The method for the synthesis according to claim 48, in which the temperature is between 200 and 1200° C.

50. The method for the synthesis according to claim 49, in which the temperature is between 500 and 800° C.

51. The method for the synthesis according to claim 49, in which the time of contact between the reaction mixture and the gaseous atmosphere is between 2 minutes and 5 hours.

52. The method for the synthesis according to claim 50, in which the time of contact between the reaction mixture and the gaseous atmosphere is between 2 minutes and 5 hours.

53. The method for the synthesis according to claim 52, in which the time of contact is between 10 and 60 minutes.

54. The method for the synthesis according to claim 42, in which the gaseous reducing atmosphere is obtained by decomposition, in a vacuum or in an inert atmosphere, of an organic compound or of a mixture of organic compounds containing at least hydrogen and oxygen, bound chemically, the pyrolysis of which generates carbon monoxide, and/or a mixture of carbon dioxide and carbon monoxide, or of hydrogen and/or a mixture of hydrogen and water vapour, to carry out the reduction leading to the formation of the compound

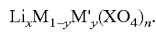

$Li_xM_{1-y}M'_y(XO_4)_n$.

55. The method for the synthesis according to claim 42, in which the gaseous reducing atmosphere is obtained by partial oxidation by oxygen or by air, of a hydrocarbon at an elevated temperature, thereby forming carbon monoxide or hydrogen or a mixture of carbon monoxide and hydrogen.

56. The method for the synthesis according to claim 55, in which the gaseous reducing atmosphere contains water vapor.

57. The method for the synthesis according to claim 56, in which water vapor is in an amount between 0.1 and 10 molecules, inclusively, of $H_2O$ per atom of carbon in the hydrocarbon.

58. The method for the synthesis according to claim 57, conducted at a temperature between 400 and 1200° C.

59. The method of synthesis according to claim 1, in which the gaseous atmosphere is made up of a gas that is reformed in-situ or ex-situ.

60. The method for the synthesis according to claim 59, in which the reformed gas atmosphere is obtained from methane or from propane or from a natural gas or from a mixture of these, with the addition of air, at a predetermined partial pressure, by condensation or injection into the reformed mixture.

61. The method for the synthesis according to claim 59, in which the reformed gas atmosphere is obtained from methane or from propane or from a natural gas or from a mixture of these, with the addition of water vapor, or with the addition of a mixture of air and water vapor, at a predetermined partial pressure, by condensation or injection into the reformed mixture.

62. The method for the synthesis according to claim 1, in which thermal processing includes the formation reaction of $Li_xM_{1-y}M'_y(XO_4)_n$, and the reduction and pyrolysis are conducted by heating from normal temperature to a temperature between 500 and 1100° C.

63. The method for the synthesis according to claim 62, in which the thermal processing includes the formation reaction of $Li_xM_{1-y}M'_y(XO_4)_n$, and the reduction, pyrolysis and dehydration of at least one of the precursors a) to d).

64. The method for the synthesis according to claim 62, in which the maximum temperature reached is between 500 and 800° C.

65. The method for the synthesis according to claim 1, in which the dwell time of the reagents in the pyrolysis step is less than 5 hours.

66. The method for the synthesis according to claim 65, in which the dwell time is less than 1 hour.

67. The method for the synthesis according to claim 1, in which electrochemical capacity of the compound $Li_xM_{1-y}M'_y(XO_4)_n$ when n=1, measured for specific intensities greater than 10 $mA \cdot g^{-1}$, is greater than 150 $mAh \cdot g^{-1}$.

68. The method for the synthesis according to claim 1, in which the source of M is also the source of X, and/or the source of M' is also the source of X, and/or the source of lithium is also the source of X, and/or the source of X is also the source of lithium.

69. The method for the synthesis according to claim 1, in which the step of bringing the mixture of precursors a) to d) into equilibrium is conducted in the form of an intimate and/or homogeneous mixture of a solid phase and the gaseous atmosphere.

70. The method for the synthesis according to claim 1, in which the at least one transition metal is at least partially chosen from the group constituted by iron, manganese, cobalt or nickel.

71. The method for the synthesis according to claim 70, in which a complement for the at least one transition metal is chosen from the group constituted by vanadium, titanium, chromium or copper.

72. The method for the synthesis according to claim 1, in which a compound is the source of M and is in an oxidation state that is 3, 4, 5, 6 or 7.

73. The method for the synthesis according to claim 72, in which the compound that is the source of M comprises ferric oxide, magnetite, manganese dioxide, di-vanadium pentoxide, trivalent ferric phosphate, ferric hydroxyphosphate, trivalent ferric nitrate or mixtures thereof.

74. The method for the synthesis according to claim 1, in which the compound that is the source of lithium is chosen from the group consisting of lithium oxide, lithium hydroxide, lithium carbonate, lithium hydroxyphosphate, neutral phosphate $Li_3PO_4$, acid phosphate $LiH_2PO_4$, orthosilicates, metasilicates and polysilicates of lithium, lithium sulfate, lithium oxalate, lithium acetate and mixtures thereof.

75. The method for the synthesis according to claim 74, in which the lithium source compound is lithium carbonate of the formula $Li_2CO_3$.

76. The method for the synthesis according to claim 1, in which the source of X is chosen from the group consisting of sulfuric acid, lithium sulfate, phosphoric acid and its esters, neutral phosphate $Li_3PO_4$, acid phosphate $LiH_2PO_4$, monoammonium and diammonium phosphates, trivalent ferric phosphate, manganese and ammonium phosphate ($NH_4MnPO_4$), silica, lithium silicates, lithium hydroxyphosphate, alkoxysilanes and their partial hydrolysis products and mixtures of the latter.

77. The method for the synthesis according to claim 76, in which the X precursor compound is ferric phosphate, anhydrous or hydrated.

78. The method for the synthesis according to claim 1, in which at least one of the lithium derivatives obtained is of the formula $LiFePO_4$, $LiFe_{1-s}Mn_sPO_4$ wherein $0 \leq s \leq 0.9$, $LiFe_{1-y}Mg_yPO_4$ and $LiFe_{1-y}Ca_yPO_4$ wherein $0 \leq y \leq 0.3$, $LiFe_{1-s-y}Mn_sMg_yPO_4$ wherein $0 \leq s \leq 1$ and $0 \leq y \leq 0.2$,
$Li_{1+x}FeP_{1-x}Si_xO_4$ wherein $0 \leq x \leq 0.9$, $Li_{1+x}Fe_{1-s}Mn_sP_{1-x}Si_xO$ wherein $0 \leq s \leq 1$ and wherein $0 \leq x \leq 0.9$, $Li_{1+z}Fe_{1-s-z}Mn_sP_{1-z}S_zO_4$ wherein $0 \leq s \leq 1$, $0 \leq z \leq 0.2$,
$Li_{1+2q}Fe_{1-s-q}Mn_sPO_4$ wherein $0 \leq s \leq 1$, and $0 \leq q \leq 0.3$, $Li_{1+r}Fe_{1-s}Mn_s(S_{1-r}P_rO_4)_{1.5}$ wherein $0 \leq r \leq 1$, $0 \leq s \leq 1$ or $Li_{0.5+u}Fe_{1-t}Ti_t(PO_4)_{1.5}$ wherein $0 \leq t \leq 1$ and wherein $0 \leq u \leq 1.5$.

79. The method for the synthesis according to claim 1, in which the reaction parameters and the kinetics of the reduction by gaseous atmosphere, are chosen such that the conducting carbon resulting from the precursor e) is not consumed in the course of the reduction process.

80. The method for the synthesis according to claim 79, in which the amount of precursor e) that is the carbon conductor source, present in the reaction medium subjected to reduction, is between 0.1 and 15% of the total mass of the reaction mixture.

81. The method for the synthesis according to claim 80, in which the amount of precursor e) that is the carbon conductor source, present in the reaction medium subjected to reduction, is between 0.3 and 1.5% of the total mass of the reaction mixture.

82. The method for the synthesis according to claim 1, in which the temperature and duration of the synthesis are chosen as a function of the nature of the transition metal and being above a minimum temperature at which the reactive atmosphere is capable of reducing the transition element or elements to their oxidation state required in the compound $Li_xM_{1-y}M'_y(XO_4)_n$ and below a temperature or a time leading to a reduction of the transition element or elements to the metallic state or an oxidation of the carbon resulting from pyrolysis of the organic substance.

83. The method for the synthesis according to claim 1, in which the compound of the formula $Li_xM_{1-y}M'_y(XO_4)_n$ is $LiMPO_4$ and the amount of carbon conductor obtained after pyrolysis is between 0.1 and 10% by mass in comparison to the mass of the compound $LiMPO_4$.

84. The method for the synthesis according to claim 1, in which the precursor e) that is the source of carbon is readily dispersible at the time of the processing to provide an intimate mixture with precursors a) to d), the mixture prepared by solubilization, by agitation, by mechanical grinding, by ultrasound homogenization optionally in the presence of a liquid, or by spray-drying of a solution of at least one precursor or a suspension or an emulsion thereof.

85. The method for the synthesis according to claim 1, in which the compound obtained has the formula $C-LiFePO_4$.

86. The method for the synthesis according to claim 1, in which the compounds of formula $C-Li-FePO_4$ are obtained in the form of particles with a core and a coating, the core being essentially constituted by a compound of the formula $LiFePO_4$.

87. The method for the synthesis according to claim 86, in which at least 95% of the core is composed of a compound of the formula $LiFePO_4$.

88. The method for the synthesis according to claim 86, in which the compound obtained has an amount of carbon conductor between 0.2 and 5% in comparison to the mass of the particles obtained.

89. The method for the synthesis according to claim 87, in which the compound obtained has an amount of carbon conductor between 0.2 and 5% in comparison to the mass of the particles obtained.

90. The method for the synthesis according to claim 17, in which the gaseous atmosphere circulates in the reactor, counter current to a precursor feed of precursors a) to d).

* * * * *

UNITED STATES PATENT AND TRADEMARK OFFICE
CERTIFICATE OF CORRECTION

PATENT NO. : 7,601,318 B2 Page 1 of 1
APPLICATION NO. : 10/362763
DATED : October 13, 2009
INVENTOR(S) : Armand et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1227 days.

Signed and Sealed this

Fourteenth Day of December, 2010

David J. Kappos
*Director of the United States Patent and Trademark Office*